(12) United States Patent
Shimotori et al.

(10) Patent No.: US 6,492,055 B1
(45) Date of Patent: Dec. 10, 2002

(54) POLYMER ELECTROLYTE FUEL STACK

(75) Inventors: Soichiro Shimotori, Yokohama (JP); Kazuo Saito, Glastonbury, CT (US); Michio Hori, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 33 days.

(21) Appl. No.: 09/626,000

(22) Filed: Jul. 26, 2000

Related U.S. Application Data

(63) Continuation of application No. PCT/JP99/06620, filed on Nov. 26, 1999.

(30) Foreign Application Priority Data

Nov. 26, 1998 (JP) .......................................... 10-336385

(51) Int. Cl.⁷ ................................................ H01M 8/02
(52) U.S. Cl. ........................................ 429/34; 429/38
(58) Field of Search .............................. 429/30, 34, 38, 429/39

(56) References Cited

U.S. PATENT DOCUMENTS

| 5,750,281 A | * | 5/1998 | Washington et al. .......... 429/39 |
| 5,804,326 A | | 9/1998 | Chow et al. |
| 5,858,567 A | * | 1/1999 | Spear, Jr. et al. ............. 429/12 |

FOREIGN PATENT DOCUMENTS

JP  7-183036  7/1995

* cited by examiner

*Primary Examiner*—Patrick Ryan
*Assistant Examiner*—M. Wills
(74) *Attorney, Agent, or Firm*—Oblon, Spivak, McClelland, Maier & Neustadt, P.C.

(57) ABSTRACT

Separators are formed to have a rectangular outline. A coolant passage is formed in a portion of each separator, which is located around a fuel gas passage or an oxidant gas passage formed in a surface of each separator, and which is substantially parallel to a long side of each separator, so that a coolant flows in a direction perpendicular to the surfaces of each separator.

16 Claims, 20 Drawing Sheets

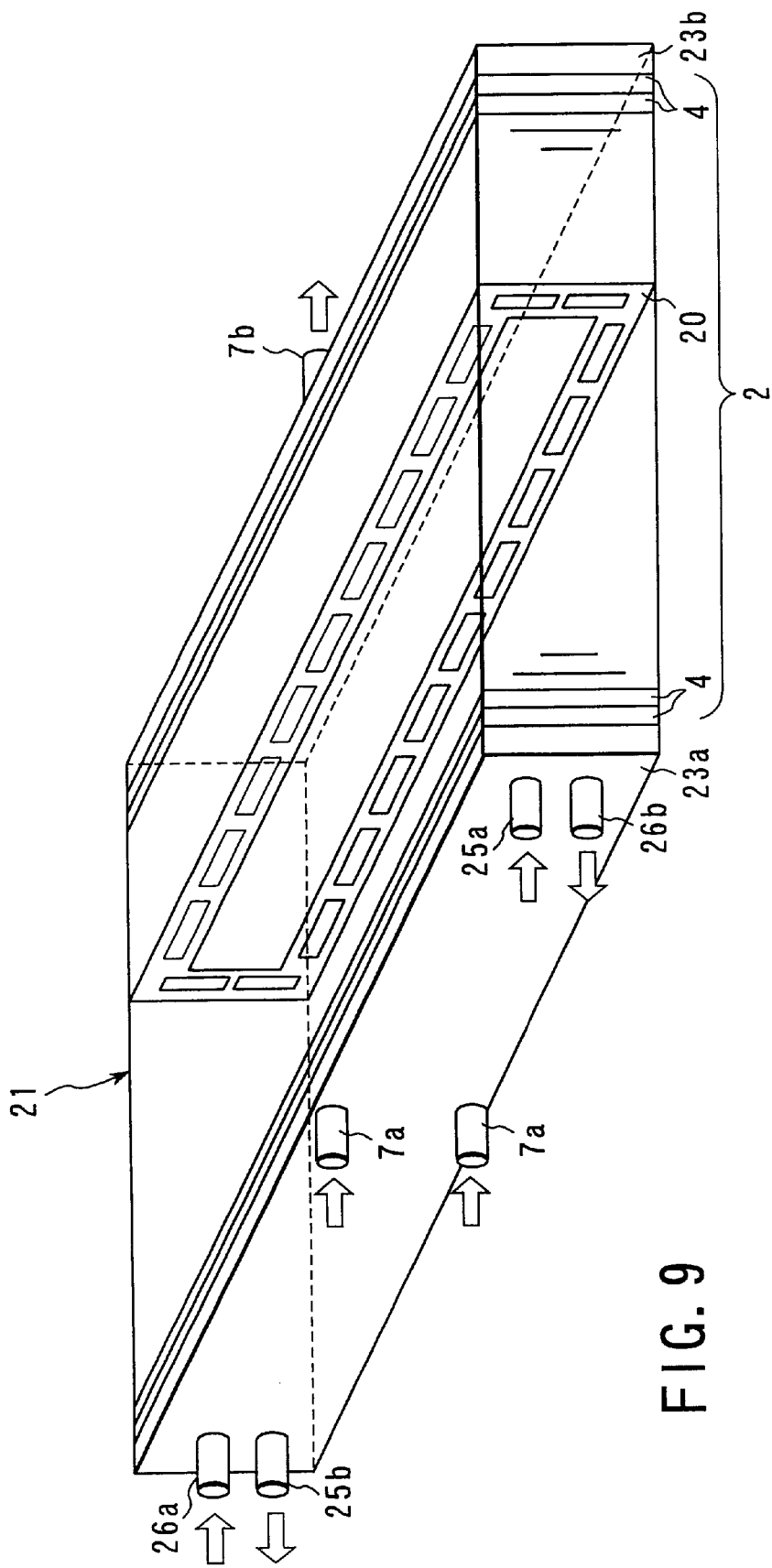

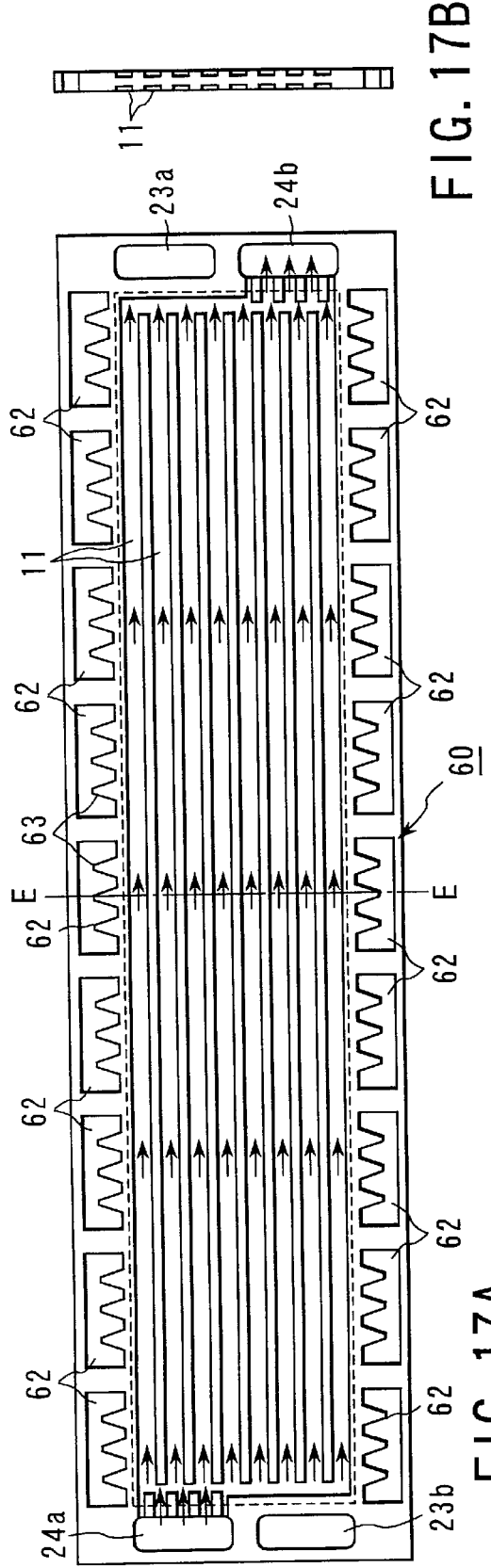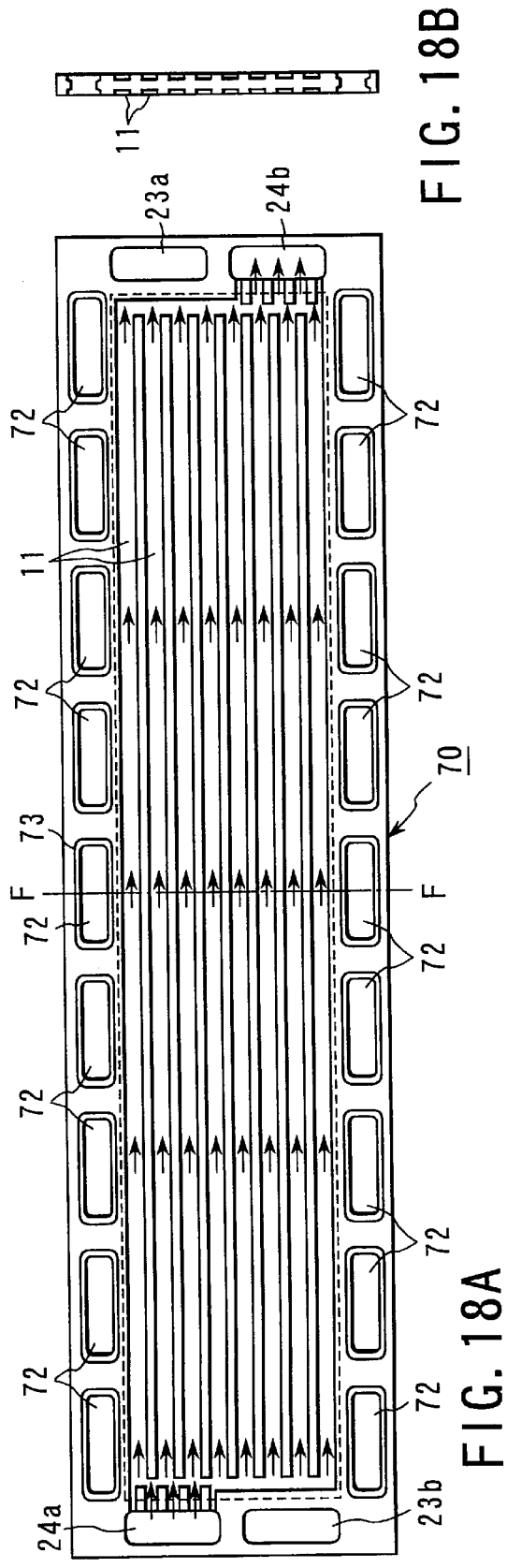

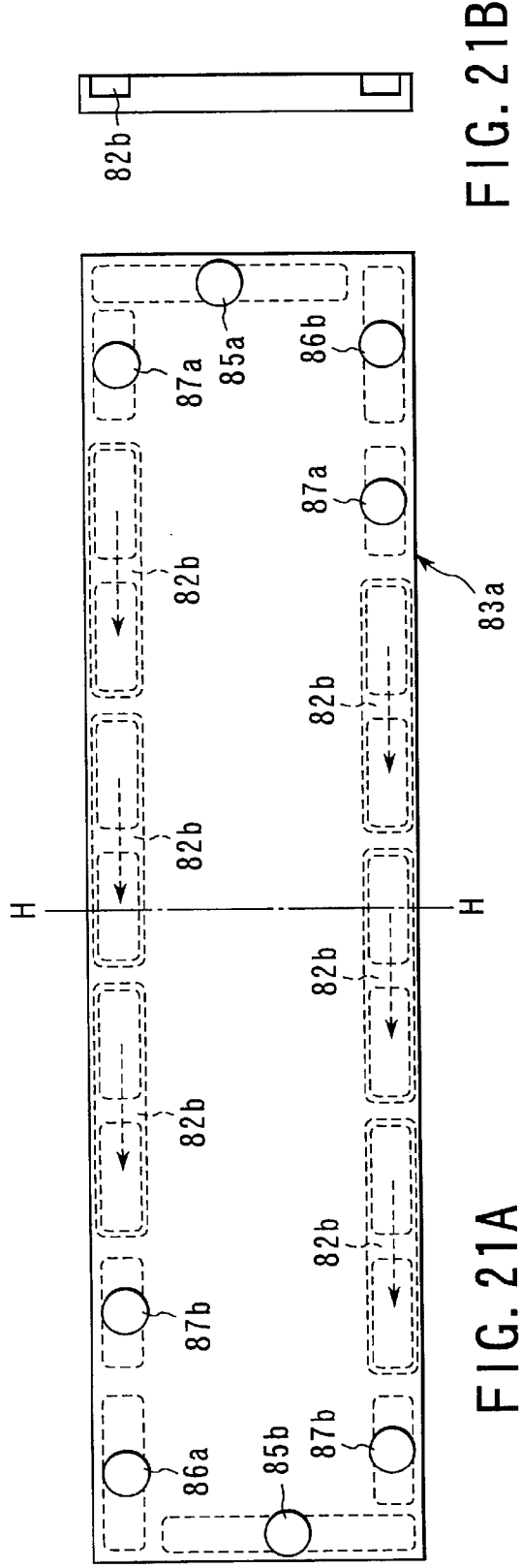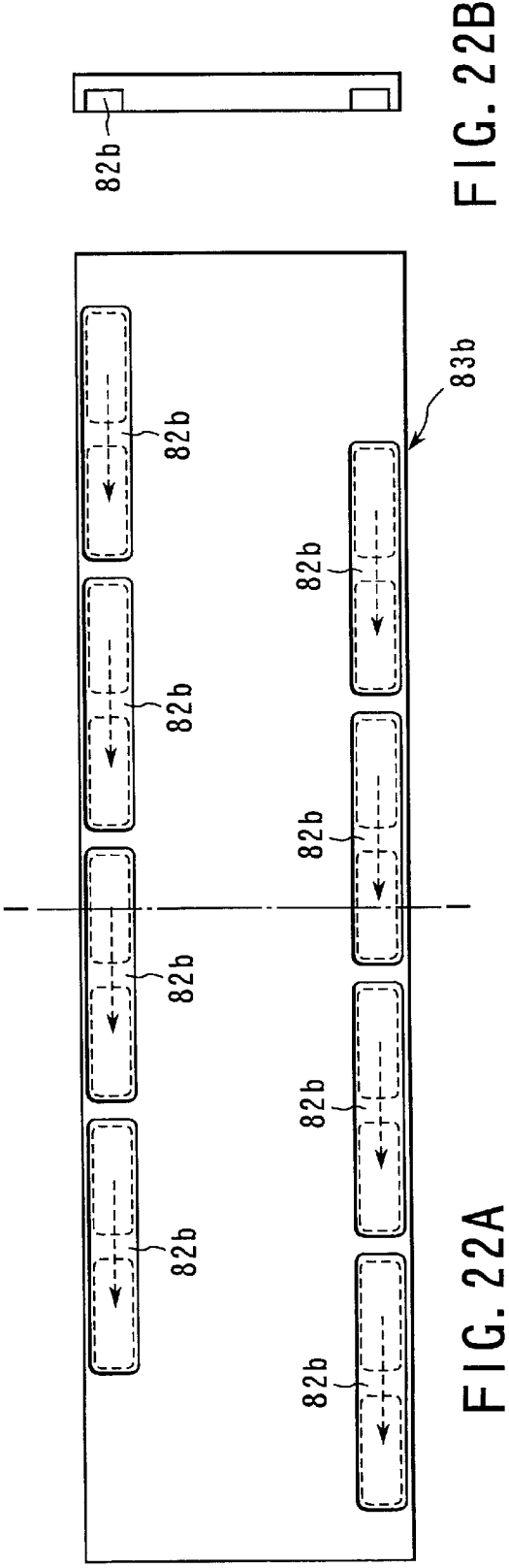

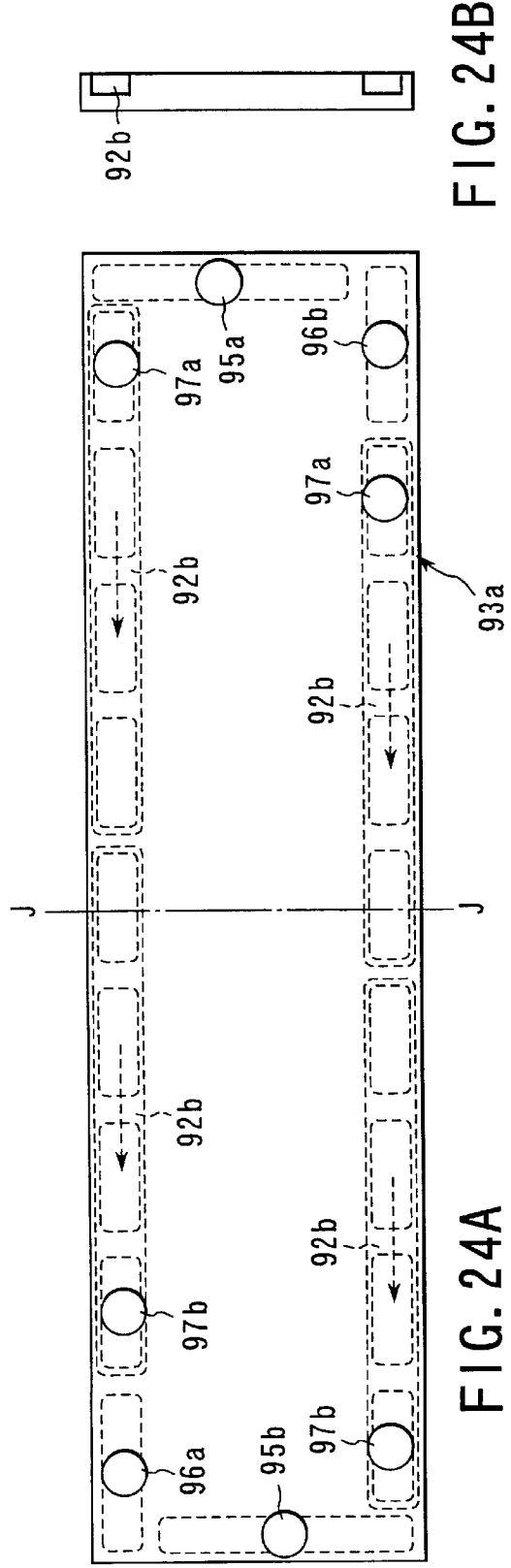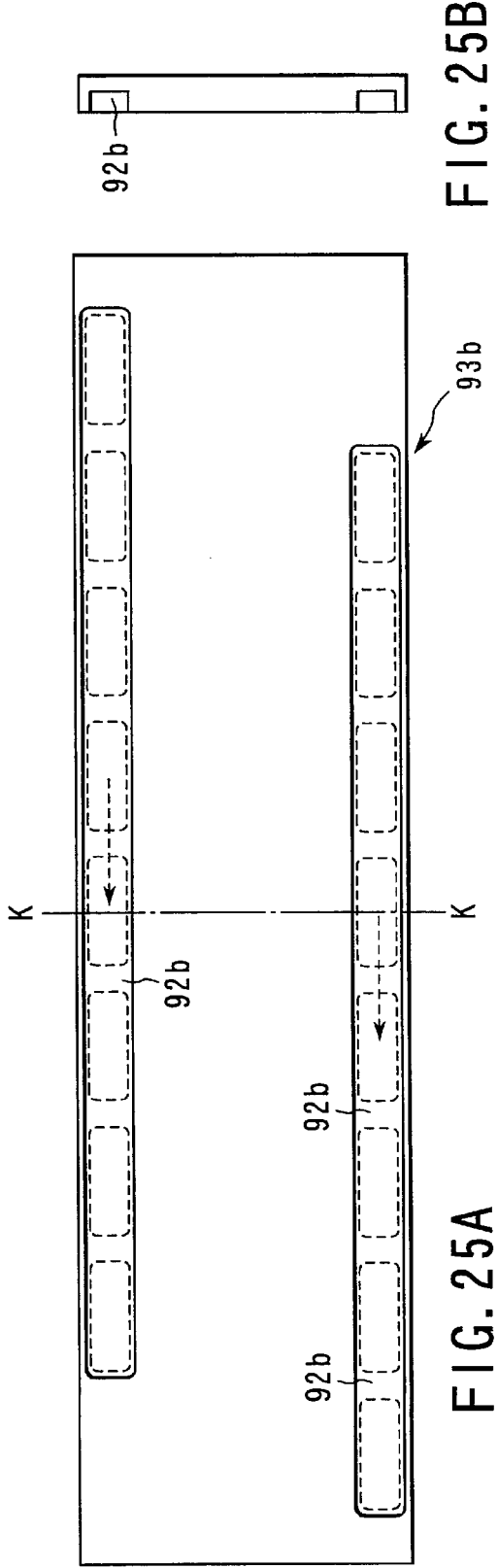

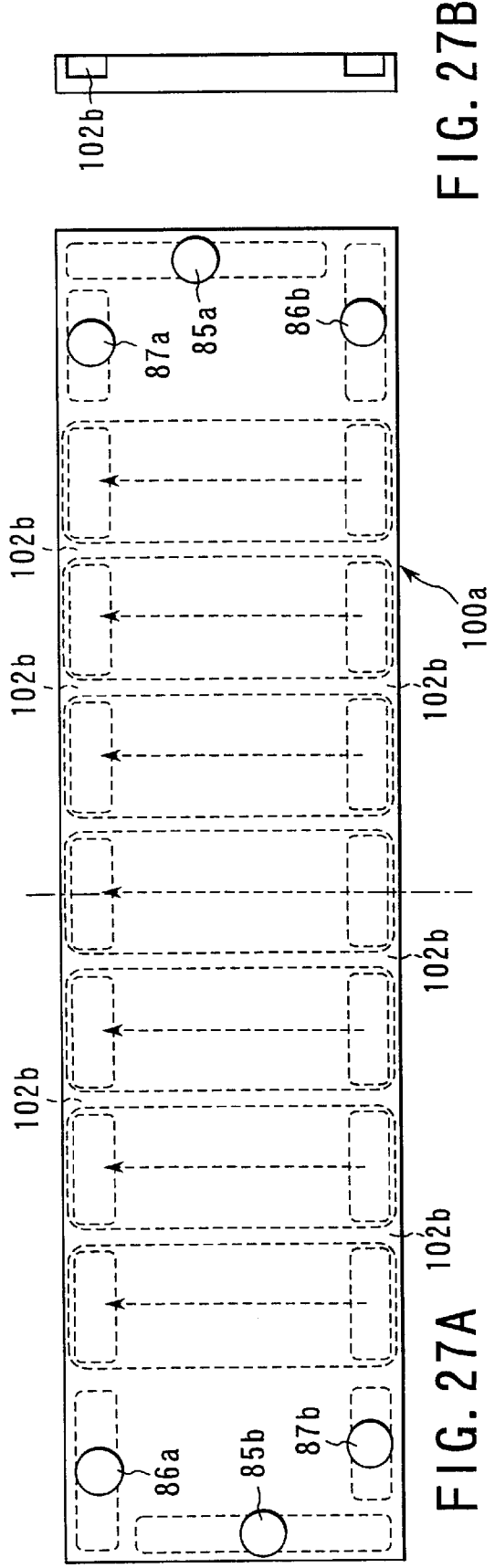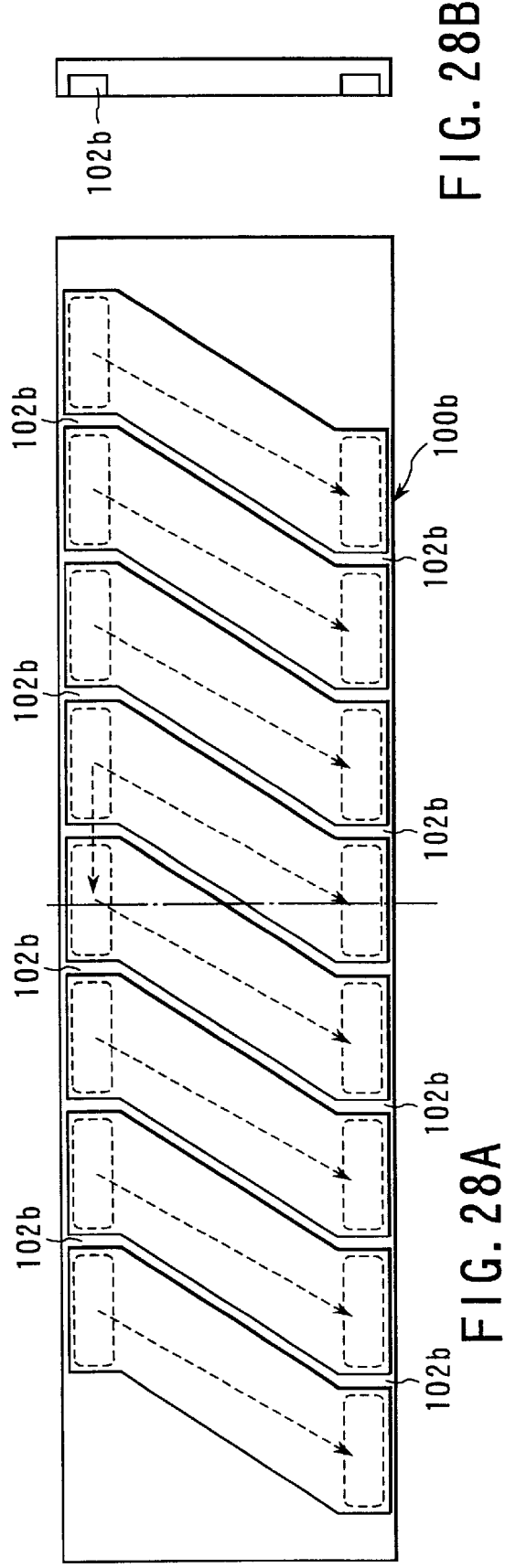

POLYMER ELECTROLYTE FUEL STACK

CROSS-REFERENCE TO RELATED APPLICATIONS

This is a continuation of Application No. PCT/JP99/06620, filed Nov. 26, 1999.

This application is based upon and claims the benefit of priority from the prior Japanese Patent Application No. 10-336385, filed Nov. 26, 1998, the entire contents of which are incorporated herein by reference.

BACKGROUND OF THE INVENTION

This invention relates to a stack for polymer electrolyte fuel cells that use, as an electrolyte, a solid polymer having ion conductivity, and more particularly to a polymer electrolyte fuel cell stack improved to have a large electrode area.

Attention is now being paid to fuel cells that serve as highly efficient energy converting devices. These fuel cells are roughly divided into a low-temperature operable fuel cell such as an alkali fuel cell, a polymer electrolyte fuel cell, a phosphoric acid fuel cell, etc., and a high-temperature operable fuel cell such as a molten carbonate fuel cell, a solid oxide fuel cell, etc.

Among the above-mentioned fuel cells, a polymer electrolyte fuel cell (hereinafter referred to as a "PEFC"), which uses a solid polymer electrolyte membrane having proton conductivity, is expected to be used as a power supply for space or vehicle equipment, since it has a compact structure, provides a high output density and is operable by a simple system.

As the polymer electrolyte membrane (hereinafter referred to as a "polymer membrane"), a perfluorocarbon sulfonic acid membrane (e.g. Nafion: name of commodity, produced by Dupont Company), for example, is used. This polymer membrane is held between a pair of porous electrodes (an anode and a cathode) having a catalyst such as platinum, thereby constituting a membrane/electrode assembly. The polymer membrane and the porous electrodes are in the shape of a sheet, and have a thickness of about 1 mm or less so as to reduce the internal resistance thereof.

Further, the polymer membrane and electrode sheets are usually rectangular. The area of each electrode is determined on the basis of a current required for power generation and a current value per unit area, i.e. the current density. Most of the electrodes are set to have an area of about 100 $cm^2$ or more, i.e. to have one side of 10 cm or more. The polymer membrane also has a function of preventing mixture of gasses supplied to the anode and the cathode, and hence is set to have a larger area than the electrodes.

To extract a current from the membrane/electrode assembly, current collectors are provided outside the anode and the cathode. The current collectors have a large number of grooves extending parallel to the surfaces of the anode and the cathode. These grooves serve as gas passages for supplying the anode and the cathode with a fuel gas and an oxidant gas required for reaction in the cell, respectively. Moreover, since voltage generated by a single membrane/electrode assembly is as small as 1V or less, a PEFC stack structure is formed by stacking a plurality of membrane/electrode assemblies and connecting them in series. This structure needs a cathode current collector and a cathode current collector, and therefore a separator is used, which includes collectors respectively provided at the anode side and the cathode side of the adjacent membrane/electrode assemblies, and formed integral as one body.

Each membrane/electrode assembly generates heat during reaction in the cell. It is a usually used cooling method to insert a cooling plate between a plurality of membrane/electrode assemblies and circulate cooling water in the cooling plate. This method, however, requires a separator for supplying the cooling water, in addition to a separator for supplying gases. This results in an increase in the thickness in the direction of stacking.

Japanese Patent Application KOKAI Publication No. 10-21949 discloses, as a method for solving the problem, a method for forming cooling water passages around the gas passages to dispense with the cooling plate inserted between the membrane/electrode assemblies. More specifically, in the technique disclosed in this publication, passages 202 for circulating cooling water are formed in upper, lower, left and right four portions of a separator 200 which has grooves 21 formed as gas passages at a central portion thereof, as is shown in FIG. 1, and cooling water is circulated in the passages 202 to eliminate reaction heat.

However, the above cooling method has the following problems:

A first problem is that the reaction area cannot be enlarged. In the above-mentioned cooling method, heat generated from the membrane/electrode assemblies that hold the separator 200 is transferred to the separator 200 conducted in a direction perpendicular to the thickness direction of the separator, and is removed by cooling water flowing through the passages 202. In other words, the temperature of a central reaction portion of the separator becomes higher than its peripheral portion.

Accordingly, if the reaction area is increased, the distance between the center of the reaction portion and each cooling passage increases, and a temperature difference, as above, also increases. On the other hand, increasing the thickness of the separator to thereby increase the cross section, i.e. the heat transfer area, can be contrived in order to reduce the temperature difference. This method, however, inevitably increases the thickness of the cell and hence the entire cell size.

A second problem is that a three-dimensional temperature distribution occurs in the separator plane. Specifically, in the above-described cooling method, the temperature is so distributed in the separator plane that it is higher at a central portion than at peripheral four sides. Therefore, even if the gas passages are formed flat, moisture created as a result of reaction condenses at a peripheral portion of the separator, and hence cannot be efficiently collected.

A third problem is that supply manifold and exhaust manifold for the fuel gas and the oxidant gas cannot be enlarged. Where cooling water passages are arranged around gas passages as shown in FIG. 21, the supply manifold and the exhaust manifold for the fuel gas and the oxidant gas must be arranged at the four corners, thereby reducing the cross sections of the supply manifold and the exhaust manifold than those of the cooling water passages.

This means that when the reaction area is enlarged and a great amount of fuel gas or oxidant gas is required, the fuel gas or the oxidant gas cannot uniformly be distributed to each cell of a fuel cell stack, since the cross section of the supply port, i.e. the cross section of a gas distributing manifold, inevitably reduces.

BRIEF SUMMARY OF THE INVENTION

It is the object of the invention to provide a polymer electrolyte fuel cell stack, which is compact but has a large reaction area, and can smoothly supply gas.

To attain the object, there is provided a polymer electrolyte fuel cell stack including a plurality of cells stacked on each other, each cell having an anode, a cathode and a solid polymer electrolyte membrane held between the anode and the cathode, the cells being stacked on each other via separators that each have at least one of a fuel gas passage for supplying the anode with a fuel gas, and an oxidant gas passage for supplying the cathode with an oxidant gas, characterized in that: each of the separators has a rectangular outline; and a coolant passage is formed in a portion of each separator, which is located around the fuel gas passage and the oxidant gas passage and is substantially parallel to a long side of each separator, such that a coolant flows in a direction perpendicular to a surface of each separator.

Since in the invention constructed as above, each separator has a rectangular outline and has a coolant passage in a portion thereof substantially parallel to its long side, the distance between a central portion and the upper or the lower end of each electrode can be reduced. Accordingly, the temperature difference between the central portion and the upper or lower end of each electrode can be minimized. Further, heat generated during reaction is transferred vertically, and hence the temperature is almost constant horizontally. This means that even when the reaction area is enlarged, the temperature difference in each separator can be minimized. Furthermore, since it is not required to insert a cooling member in a direction in which cells are stacked, the thickness in the cell-stacked direction can be reduced.

According to another aspect of the invention, there is provided a polymer electrolyte fuel cell stack including a plurality of cells stacked on each other, each cell having an anode, a cathode and a solid polymer electrolyte membrane held between the anode and the cathode, the cells being stacked on each other via separators that each have at least one of a fuel gas passage for supplying the anode with a fuel gas, and an oxidant gas passage for supplying the cathode with an oxidant gas, characterized in that: each of the separator has a rectangular outline; and a plurality of coolant passages are formed in portions of each separator, which are located substantially parallel to opposite long sides of the separator, such that a coolant flows in a direction perpendicular to a surface of the separator.

Since in the invention constructed as above, a plurality of coolant passages are provided in portions of each separator substantially parallel to the opposite long sides of each separator, a more excellent cooling effect than that of the invention of claim 1 can be obtained.

According to yet another aspect of the invention, there is provided a polymer electrolyte fuel cell stack including a plurality of cells stacked on each other, each cell having an anode, a cathode and a solid polymer electrolyte membrane held between the anode and the cathode, the cells being stacked on each other via a separator that has at least one of a fuel gas passage for supplying the anode with a fuel gas, and an oxidant gas passage for supplying the cathode with an oxidant gas, characterized in that: each of the separators has a rectangular outline; and a surface of each separator, which contacts the electrodes, has a plurality of cooling areas, a coolant passage being formed in a central portion of each of the cooling areas such that a coolant flows in a direction perpendicular to a surface of each separator.

Since in the invention constructed as above, a coolant passage is formed in a central portion of each cooling area, reaction heat generated in each cooling area is removed by the coolant flowing through each cooling passage. In this case, the inner wall of each coolant passage serves as a heat transfer area. Since each coolant passage is situated at the center of each cooling area, its entire inner wall can be used as the heat transfer area. Accordingly, efficient cooling can be executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a perspective view showing the structure of a polymer electrolyte fuel cell stack according to a second embodiment of the invention.

FIGS. 17A and 17B are views showing the structure of a separator incorporated in an eighth embodiment, FIG. 17A being a front view of a fuel-gas-passage side portion of the separator, and FIG. 17B being a sectional view taken along lines E—E in FIG. 17A.

FIGS. 18A and 18B are views showing the structure of a separator incorporated in a ninth embodiment, FIG. 18A being a front view of a fuel-gas-passage side portion of the separator, and FIG. 18B being a sectional view taken along lines F—F in FIG. 18A.

FIGS. 21A and 21B are views showing the structure of a front end plate appearing in FIG. 19, FIG. 21A being a front view, and FIG. 21B being a sectional view taken along lines H—H in FIG. 21A.

FIGS. 22A and 22B are views showing the structure of a rear end plate appearing in FIG. 19, FIG. 22A being a front view, and FIG. 22B being a sectional view taken along lines I—I in FIG. 22A.

FIGS. 24A and 24B are views showing the structure of a front end plate appearing in FIG. 23, FIG. 24A being a front view, and FIG. 24B being a sectional view taken along lines J—J in FIG. 24A.

FIGS. 25A and 25B are views showing the structure of a rear end plate appearing in FIG. 23, FIG. 25A being a front view, and FIG. 25B being a sectional view taken along lines K—K in FIG. 25A.

FIGS. 27A and 27B are views showing the structure of a front end plate appearing in FIG. 26, FIG. 27A being a front view, and FIG. 27B being a sectional view taken along lines J—J in FIG. 27A.

FIGS. 28A and 28B are views showing the structure of a rear end plate appearing in FIG. 26, FIG. 28A being a front view, and FIG. 28B being a sectional view taken along lines L—L in FIG. 28A.

DETAILED DESCRIPTION OF THE INVENTION

The embodiments of the invention will be described in detail with reference to the accompanying drawings.

FIRST EMBODIMENT

Figure 1:
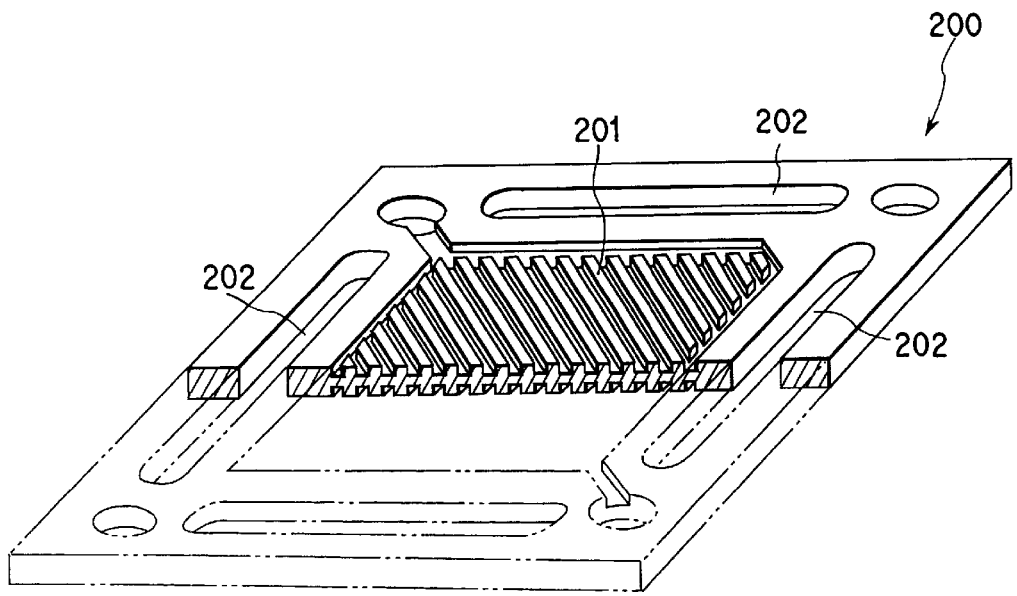
FIG. 1 is a perspective view illustrating the structure of a separator incorporated in a conventional polymer electrolyte fuel cell stack.
Figure 2:
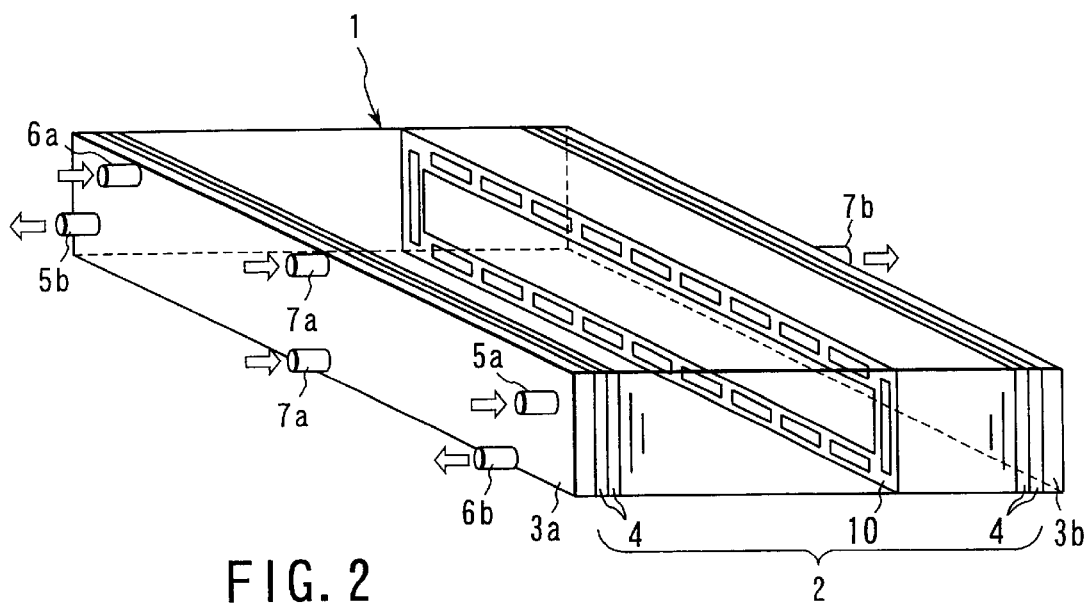
FIG. 2 is a perspective view illustrating the structure of a polymer electrolyte fuel cell stack according to a first embodiment of the invention.

FIG. 2 is a perspective view illustrating the structure of a polymer electrolyte fuel cell stack according to a first embodiment of the invention.

A fuel cell stack 1 comprises a cell section 2 and end plates 3. The cell section 2 is formed of a plurality of stacked cells 4. The end plates 3 are each provided at a corresponding one of the front and rear ends of the cell section 2, and are disposed to tighten the cell section 2 with tie rods and springs (not shown). A current terminal (not shown) is attached to the end plates 3 for extracting power generated by the fuel cell stack 1.

Pipes for fluids are attached to the front end plate 3a. Specifically, an oxidant gas inlet 5a is provided at an upper right end of the front end plate 3a, and an oxidant gas outlet 5b is provided at a lower left end of the end plate. Further, a fuel gas inlet 6a is provided at an upper left portion of the end plate 3a, and a fuel gas outlet 6b is provided at a lower right portion thereof. Furthermore, coolant inlets 7a are provided at upper and lower ends of a central portion of the front end plate 3a. On the other hand, coolant outlets 7b are provided at upper and lower ends of a central portion of the rear end plate 3b.

Figure 3:
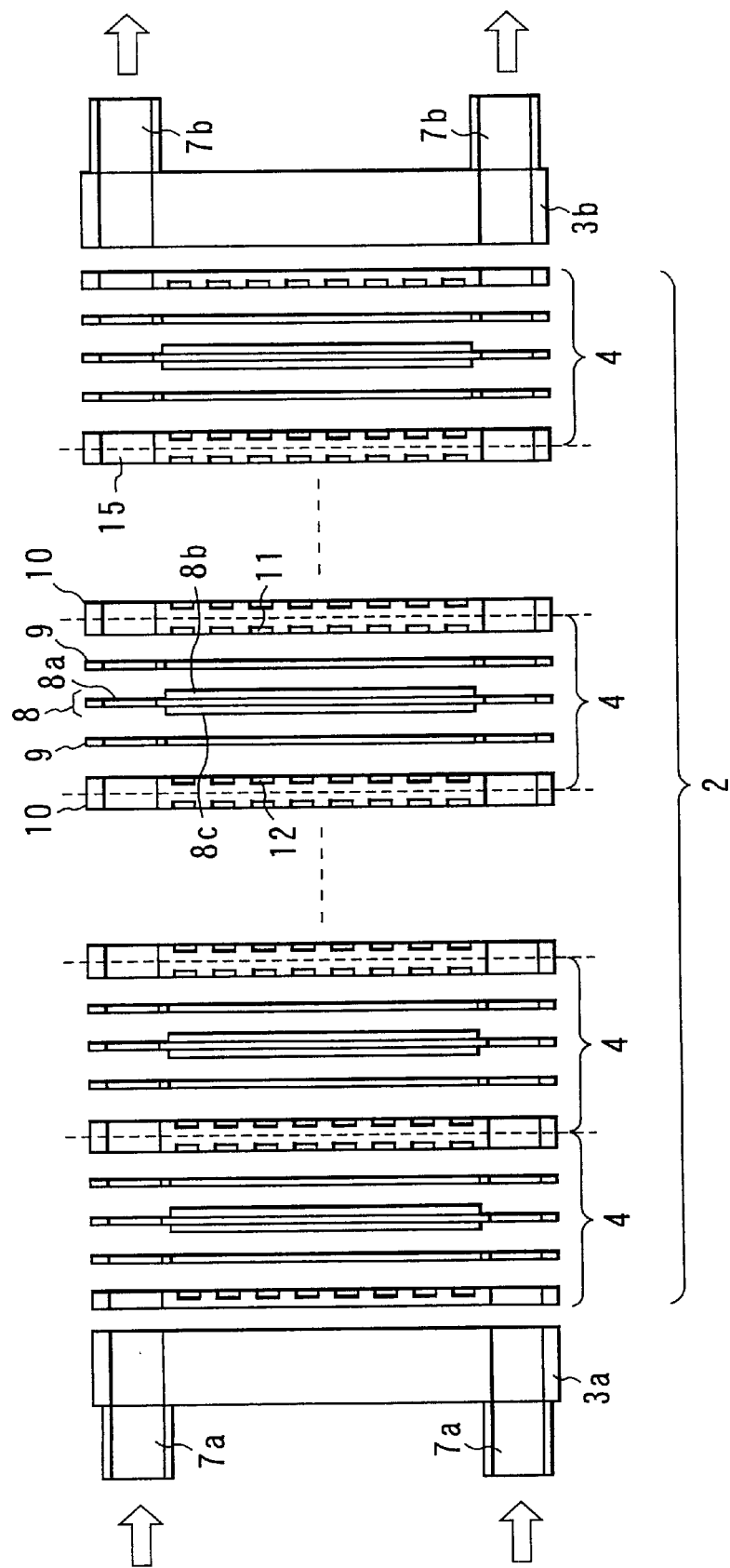
FIG. 3 is a sectional view showing the fuel cell stack of FIG. 2.

FIG. 3 shows a cross section of the fuel cell stack 1 of FIG. 2, which is obtained when the stack is cut along a plane including the axes of the coolant inlets 7a and the coolant outlets 7b. As shown, each cell 4 comprises a membrane/electrode assembly (MEA) 8, a pair of seal gaskets 9 and a pair of separators 10. The membrane/electrode assembly 8 is constituted of an electrolyte membrane 8a and two electrodes, i.e. an anode 8b and a cathode 8b. Further, each separator 10 has grooves formed for gas flow in opposite surfaces of a central portion thereof. Specifically, fuel gas passages 11 are formed in a surface that is in contact with the anode 8b, while oxidant gas passages 12 are formed in a surface that is in contact with the cathode 8c. Each seal gasket 9 has those portions cut off, which correspond to both electrodes, a gas manifold and a coolant passage, and has substantially the same thickness as the electrodes.

Figures 4A, 4B:
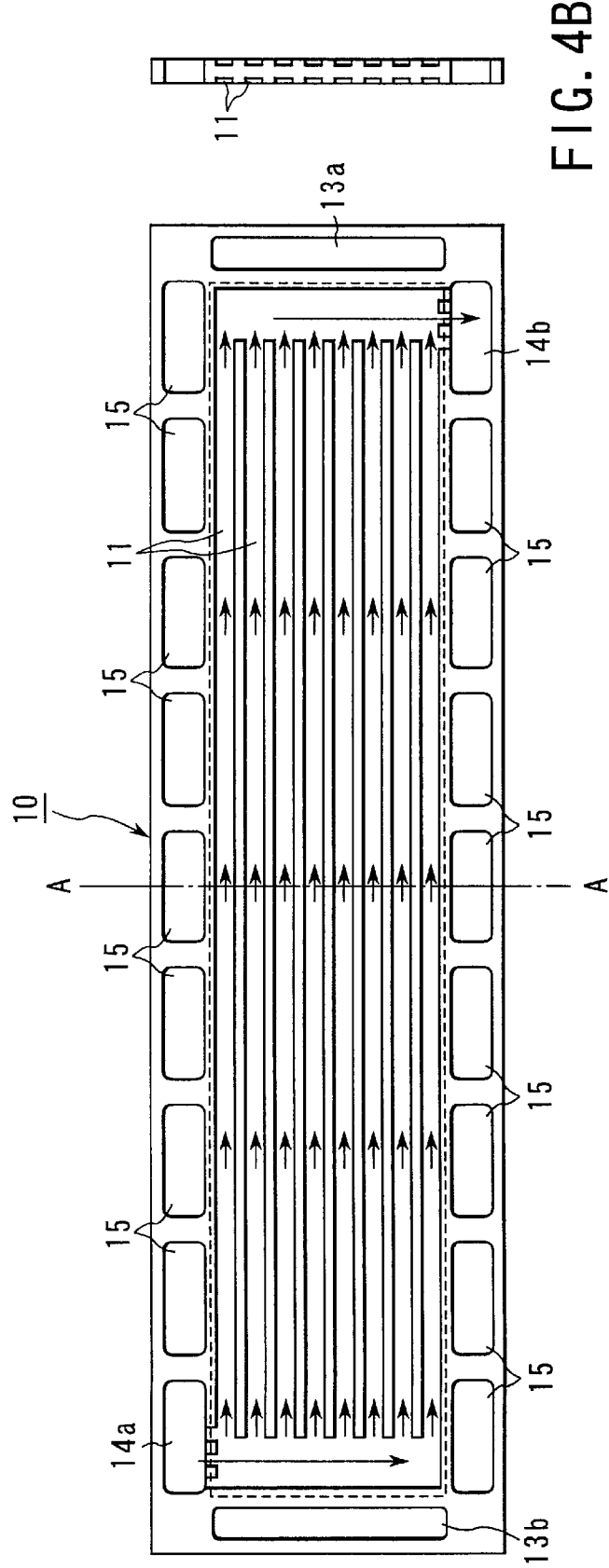
FIGS. 4A and 4B are views showing the structure of a separator incorporated in the first embodiment, FIG. 4A being a front view of a fuel-gas-passage side portion of the separator, and FIG. 4B being a sectional view taken along lines A—A in FIG. 4A.

FIGS. 4A and 4B show the structure of one separator, FIG. 4A being a front view of a fuel-gas-passage side portion of one separator 10, and FIG. 4B being a sectional view taken along line A—A of FIG. 4A. The outer dimensions of each separator 10 are 25 cm in length, 7 cm in width and 2 mm in thickness. The separators 10 are formed of a conductive, solid structure, and hence made of solid carbon material in this embodiment.

A plurality of through holes are formed in peripheral portions of each separator 10. Specifically, an oxidant gas supply manifold 13a and an oxidant gas discharge manifold 13b are formed in a right portion and a left portion of each separator 10, respectively. Furthermore, a fuel gas supply manifold 14a and eight coolant passages 15 are formed in those portions of each separator 10 which are located substantially parallel to the long side, i.e. in upper portions of each separator 10. A fuel gas discharge manifold 14b and eight coolant passages 15 are formed in lower portions of each separator 10.

Moreover, a plurality of grooves with a width of 1 mm and a depth of 0.5 mm are formed by machining in a central portion of one surface of each separator 10. These grooves communicate with the fuel gas supply manifold 14a and the fuel gas discharge manifold 14b and constitutes the fuel gas passages 11. As is indicated by the arrows in the figure, a fuel gas supplied through the fuel gas supply manifold 14a is made to flow through the grooves of each separator 10, and non-reacted fuel gas is exhausted through the fuel gas discharge manifold 14b.

Grooves similar to those formed in the one surface are formed in a central portion of the opposite surface of each separator 10, and are made to communicate with the oxidant gas supply manifold 13a and the oxidant gas discharge manifold 13b, thereby constituting the oxidant gas passages 12 for supplying and discharging an oxidant gas.

The rectangular broken line in FIG. 4A indicates the size of the anode 8b and the cathode 8c. In this embodiment, the anode and the cathode have a length of 5 cm and a width of 20 cm.

Although water may be used as a coolant introduced into the coolant passage 15, an antifreeze liquid is more preferable in light of the case of using the coolant in cold environments. In this embodiment, an ethylene glycol water solution is used. This coolant is uniformly introduced into the fuel cell stack 1 through the two coolant inlets 7a provided at the front end plate 3a shown in FIG. 2. A dividing header (not shown) is provided in the end plate 3a for distributing the coolant, introduced through the coolant inlets 7a, into eight upper flows and eight lower flows.

The coolant distributed into eight flows through the common coolant passages 15 provided in upper and lower portions of the separators 10, the seal gaskets 9 and the electrolytic membrane 8a in a direction perpendicular to the surfaces of these components. During flowing, the coolant absorbs heat from the walls of the coolant passages 15 and cools them. After cooling, the flows of the coolant reach the rear end plate 3b, then are gathered into two flows by a gathering header (not shown) provided in the rear end plate 3b, and are exhausted through the coolant outlets 7b.

Figure 5:
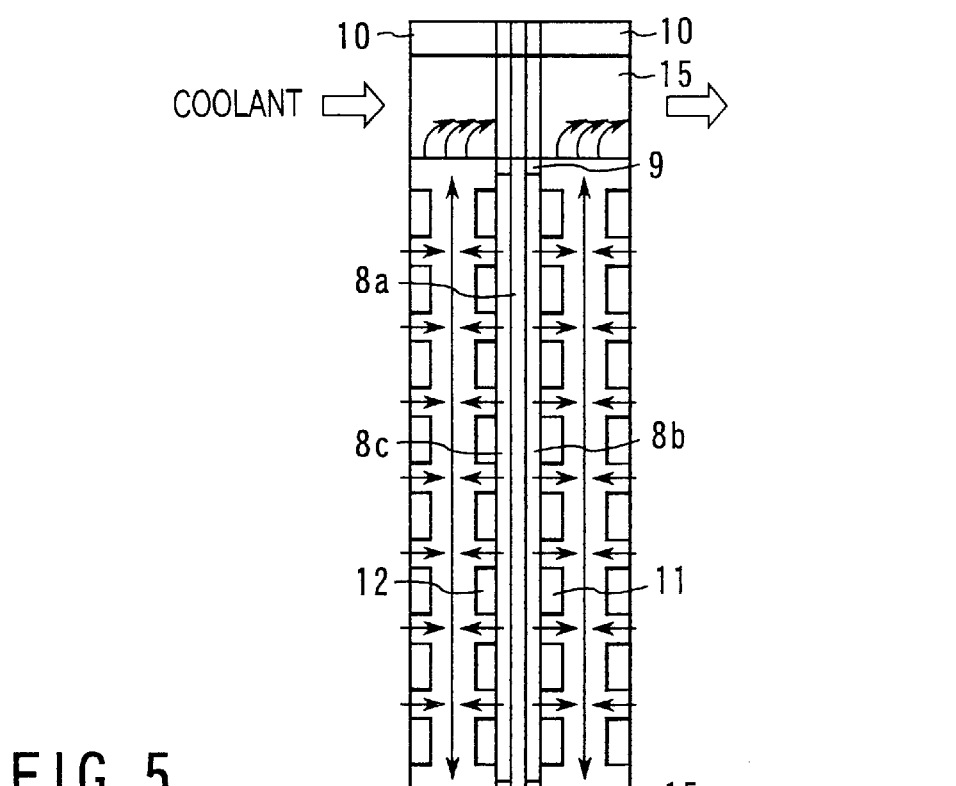
FIG. 5 is a view useful in explaining the flow of heat through each cell in the fuel cell stack of the first embodiment.

FIG. 5 is a view showing the flow of heat in each cell 4. The heat resulting from reaction in the cell is transferred through the anode 8b and the cathode 8c, transferred from the contact surfaces of the separators 10 and the electrodes into the separators and conducted in a direction perpendicular to the surfaces of the separators. After that, the heat is vertically transferred through the separators to the coolant via the walls of the coolant passages 15. Thus, the heat is removed.

A fuel cell stack according to this embodiment was prepared by stacking a hundred cells each consisting of the above-described electrode (5 cm×20 cm) and the separators (7 cm×25 cm×2 mm). Further, a conventional fuel cell stack was also prepared by stacking a hundred cells each consisting of the above-described electrode (10 cm×10 cm) and the separators (12 cm×12 cm×2 mm). $H_2$ and air were supplied as reactant gases (correspond to utilization 70% and 40%) respectively, and an ethylene glycol water solution was supplied as a coolant at an inlet temperature of 50° C. and at a flow rate of 1.5 kg/sec. Under these conditions, power generation tests were executed at a current density of 0.5 A/cm$^2$, thereby measuring the stack voltages of both fuel cell stacks, the temperature distributions of their separators and the voltage distribution of each cell the stacks. As a result, the following results were obtained.

Figure 6:
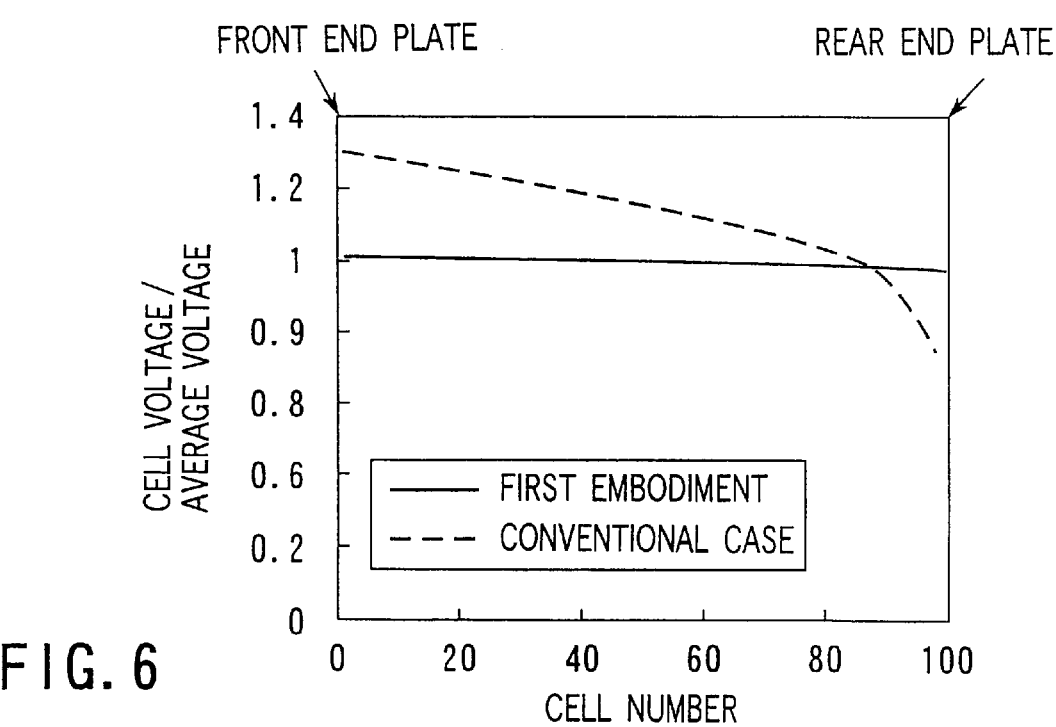
FIG. 6 is a graph showing the cell voltage distribution of the fuel cell stack of the first embodiment.

FIG. 6 shows the voltage distribution characteristic of each unit cell incorporated in the fuel cell stack of the embodiment and the conventional fuel cell stack, verified by the inventors. Cell numbers are attached to the cells in order, beginning from a cell closest to the front end plate, i.e. the end plate provided with the supply manifold and the exhaust manifold of the fuel gas and the oxidant gas.

In the fuel cell stack of the embodiment, the unit cells had substantially the same voltage. This seems to be because the oxidant supply manifold provided in a portion substantially parallel to the short side of each separator has a sufficient cross sectional area (1 cm×5 cm).

On the other hand, in the conventional fuel cell stack, gas supply/discharge manifolds were provided at the four corners of each separator, and they had only a small size of cross sectional area 1 cm×1 cm. Accordingly, the oxidant gas could not be uniformly supplied to each unit cell, with the result that there occurred ±30% variations in voltage with respect to the average voltage. As is understood from this, the oxidant supply manifold provided in a portion substantially parallel to the short side of each separator has a sufficient cross sectional area, thereby enabling uniform distribution of the fuel gas or the oxidant gas to each unit cell of the stacks, even when the reaction area is increased and a large amount of fuel gas or oxidant gas is required.

Figure 7:
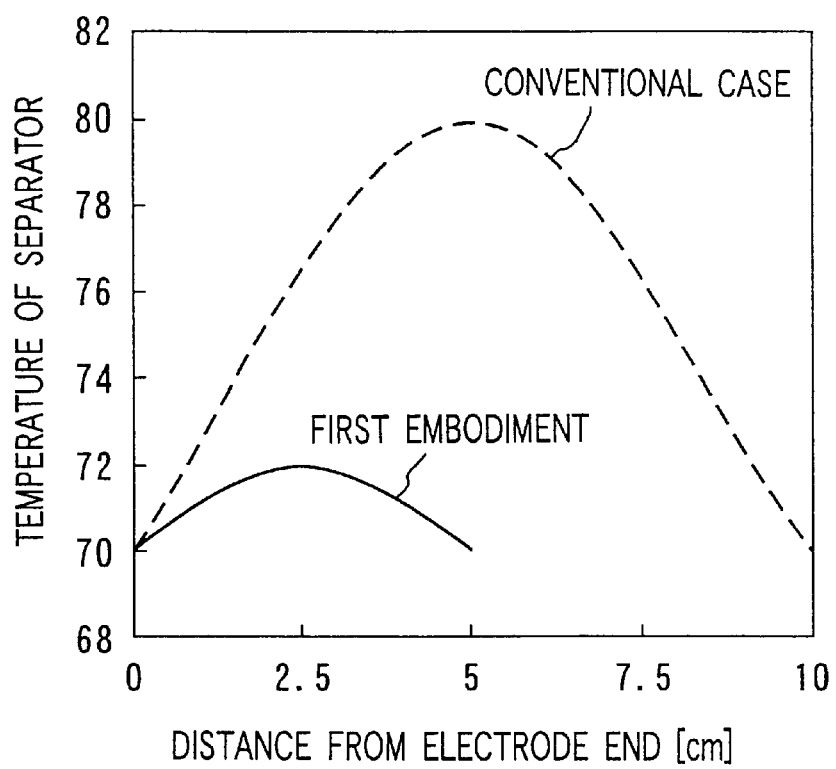
FIG. 7 is a graph showing the vertical temperature distributions of the conventional separator and the separator of the first embodiment.
Figure 8:
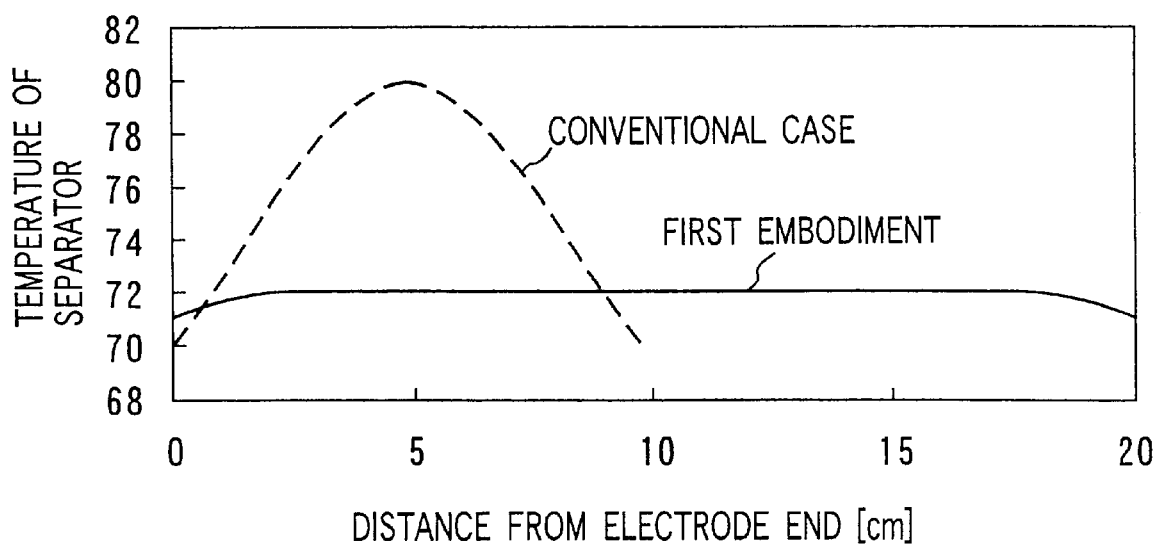
FIG. 8 is a graph showing the horizontal temperature distributions of the conventional separator and the separator of the first embodiment.

FIG. 7 shows the vertical temperature distribution of each separator verified by the inventors, while FIG. 8 shows the temperature distribution of each separator in the horizontal direction, verified by the inventors. As is evident from the figures, in the conventional fuel cell stack, the temperature distribution is identical in both the vertical direction and the horizontal direction, since the electrodes and the separators are square, and coolant passages are formed around them. However, the temperature of a central portion of each electrode was 80° C., which is higher by 10° C. than that of a peripheral portion, since an end portion of each electrode is separate by 5 cm from the central portion.

On the other hand, in the fuel cell stack of the embodiment, the vertical length of each electrode is as short as 5 cm, which means that the electrode end portion is separate from the central portion only by 2.5 cm. Accordingly, the temperature difference between the peripheral portion and the central portion could be reduced to as a low value as 2° C. Moreover, since heat is transferred vertically as shown in FIG. 5, the horizontal temperature distribution is almost uniform at 72° C. (see FIG. 8).

The stack voltages were also measured. It was found that the stack voltage of the conventional fuel cell stack was 40V, whereas that of the fuel cell stack of the embodiment was 55V. The reason why such a high stack voltage was obtained is that an increase in the temperature of a central portion of each electrode can be suppressed as shown in FIGS. 7 and 8, and therefore that evaporation of water, which keeps the conductivity of the membrane, can be prevented.

As described above, the outside of each separator is formed rectangle, and coolant passages are formed in those portions of each separator around its gas passages, which are substantially parallel to the long sides of each separator, so that a coolant can flow in a direction perpendicular to the surface of each separator. This structure can remove heat generated by reaction in each fuel cell, and can minimize temperature differences in each separator.

When increasing the reaction area, the length of those short sides of each separator, through which heat is transferred, can be maintained as it is by extending the long sides of each electrode and each separator. Thus, temperature differences in each separator can be minimized as in the above case.

SECOND EMBODIMENT

Figures 10A, 10B:
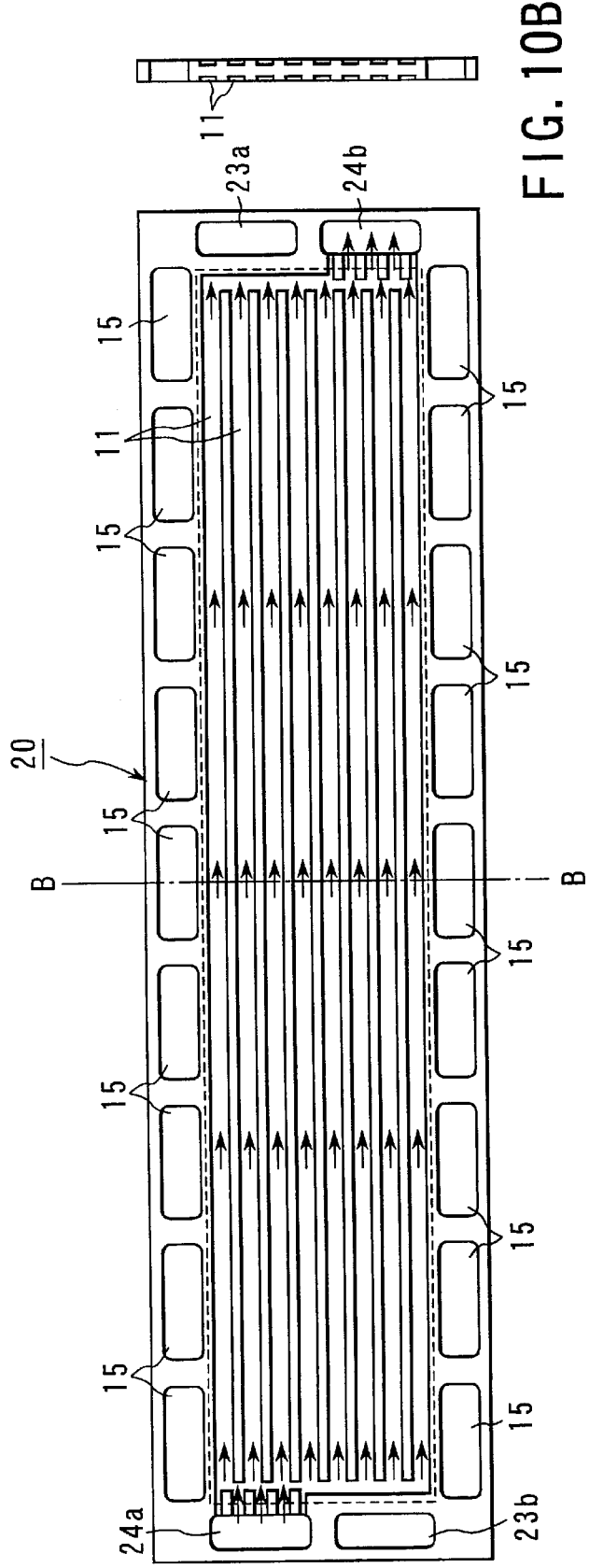
FIGS. 10A and 10B are views showing the structure of a separator incorporated in the second embodiment, FIG. 10A being a front view of a fuel-gas-passage side portion of the separator, and FIG. 10B being a sectional view taken along lines B—B in FIG. 10A.

This embodiment is a modification of the first embodiment, in which the fuel gas supply manifold and the fuel gas discharge manifold are formed in side portions of each separator. FIG. 9 is a perspective view illustrating a polymer electrolyte fuel cell stack according to a second embodiment. FIGS. 10A and 10B are views showing the structure of a separator, FIG. 10A being a front view of a fuel-gas-passage side portion of the separator, and FIG. 10B being a sectional view taken along lines B—B in FIG. 10A.

In this embodiment, the fuel gas supply manifolds and the fuel gas discharge manifolds in the fuel cell stack of the first embodiment are used as coolant passages, while each of the oxidizer supply manifold and the oxidizer discharge manifold in the first embodiment is vertically divided into two portions, one of two portions being used as a fuel gas supply manifold 24a and one of the other two portions being used as a fuel gas discharge manifold 24b.

More specifically, as shown in FIGS. 10A and 10B, a fuel gas supply manifold 24a and an oxidant gas discharge manifold 23b are provided in those peripheral left portions of each separator around gas passages, which are substantially parallel to the short sides of each separator, while an oxidant gas supply manifold 23a and a fuel gas discharge manifold 24b are provided in those peripheral right portions of each separator around the gas passages, which are substantially parallel to the short sides of each separator.

In accordance with the above structure, an oxidant gas inlet 25a and a fuel gas outlet 26b are vertically provided at right side portions of the front end plate 23a, while a fuel gas inlet 26a and an oxidant gas outlet 25b are vertically provided at left side portions of the end plate 23a, as is shown in FIG. 9. A coolant inlet 7a and a coolant outlet 7b are provided in the same positions as in the first embodiment.

Further, as is shown in FIGS. 10A and 10B, fuel gas passages 11 formed in a central portion of each separator communicate with the fuel gas supply manifold 24a provided in an upper left side portion and a fuel gas discharge manifold 24b provided in a lower right side portion, in order to supply and discharge a fuel gas to and from each separator as indicated by the arrows. On the other hand, the coolant flows through nine passages provided in upper and lower portions of each separator in a direction perpendicular to the surface of each separator, thereby absorbing reaction heat from the coolant passage walls and cooling them.

In this embodiment, each electrode was set to have a length of 20 cm and a width of 5 cm, and each separator was set to have a length of 25 cm, a width of 7 cm and a thickness of 2 mm. Further, solid carbon material was used as the material of the separators. Each unit cell was formed using these members, and a hundred of such unit cells were stacked to execute a power generation test. The employed test conditions were the same as in the first embodiment.

As a result, the temperature of a peripheral portion was 70° C., and that of a central portion was 71.7° C., which means that the temperature difference in the vertical direction is further smaller than in the first embodiment. This seems to be because the coolant passages were increased by two passages—upper and lower passages—and hence the heat transmitting area increased. In addition, like the first embodiment, the stack voltage was 56V higher than that of the conventional fuel cell stack.

As described above, the structure is employed in which a fuel or oxidant gas supply or discharge manifold is provided around gas passages in that portion of each separator, which is substantially parallel to the short sides of each separator. Accordingly, all upper and lower portions of each separator, included in peripheral portions of each separator around the gas passages, can be used as coolant passages. This enables an increase in the area of the coolant passage walls and hence an increase in heat transmitting area, thereby minimizing the temperature difference even in the case of a large electrode area.

Furthermore, provision of a fuel gas supply manifold and an oxidant gas supply manifold in portions of each separator parallel to its short sides permits the manifolds to have a large cross section. This enables uniform distribution of a fuel gas or an oxidant gas to each unit cell even when the reaction area is increased and a large amount of fuel gas or oxidant gas is required.

THIRD EMBODIMENT

In this embodiment, each separator, which has the same structure as that used in the second embodiment, is formed of a sheet made of flexible graphite carbon. The sheet made of flexible graphite carbon is also called "expanded graphite material" and characterized in that it is soft and hence can be easily molded, and has an excellent sealing performance. Moreover, the sheet is anisotropic between its thickness direction and its surface direction. For example, it has thermal conductivity ten times higher in the surface direction than in the thickness direction. Accordingly, the sheet material is extremely suitable for the cooling method of the invention.

In this embodiment, a NICA film (an article name) produced by Nihon Carbon Company was used as the material of the expanded graphite sheet. Further, each separator was formed into the same shape as employed in the second embodiment. More specifically, each separator was formed by press-molding a NICA film with a thickness of 4 mm and a density of 0.5 g/cm$^3$.

Each electrode was set to be 5 cm wide and 20 cm long, and was combined with separators as described above into a unit cell. Then, a fuel cell stack was formed by stacking a hundred of such unit cells, and a power generation test was executed under the same conditions as in the second embodiment, thereby measuring the vertical temperature distribution of each separator. As a result, it was found that the temperature of a peripheral portion of each separator was 70° C. and that of a central portion was 71.5° C., which means that the temperature difference is further smaller than in the second embodiment.

In addition, the temperature difference between a central surface portion of a cathode and a central portion of each separator was measured and found to be substantially 0. Even in the case of expanded graphite that has a low thermal conductivity in the thickness direction, no problem will occur since the heat transmitting area is set large.

Figure 11:
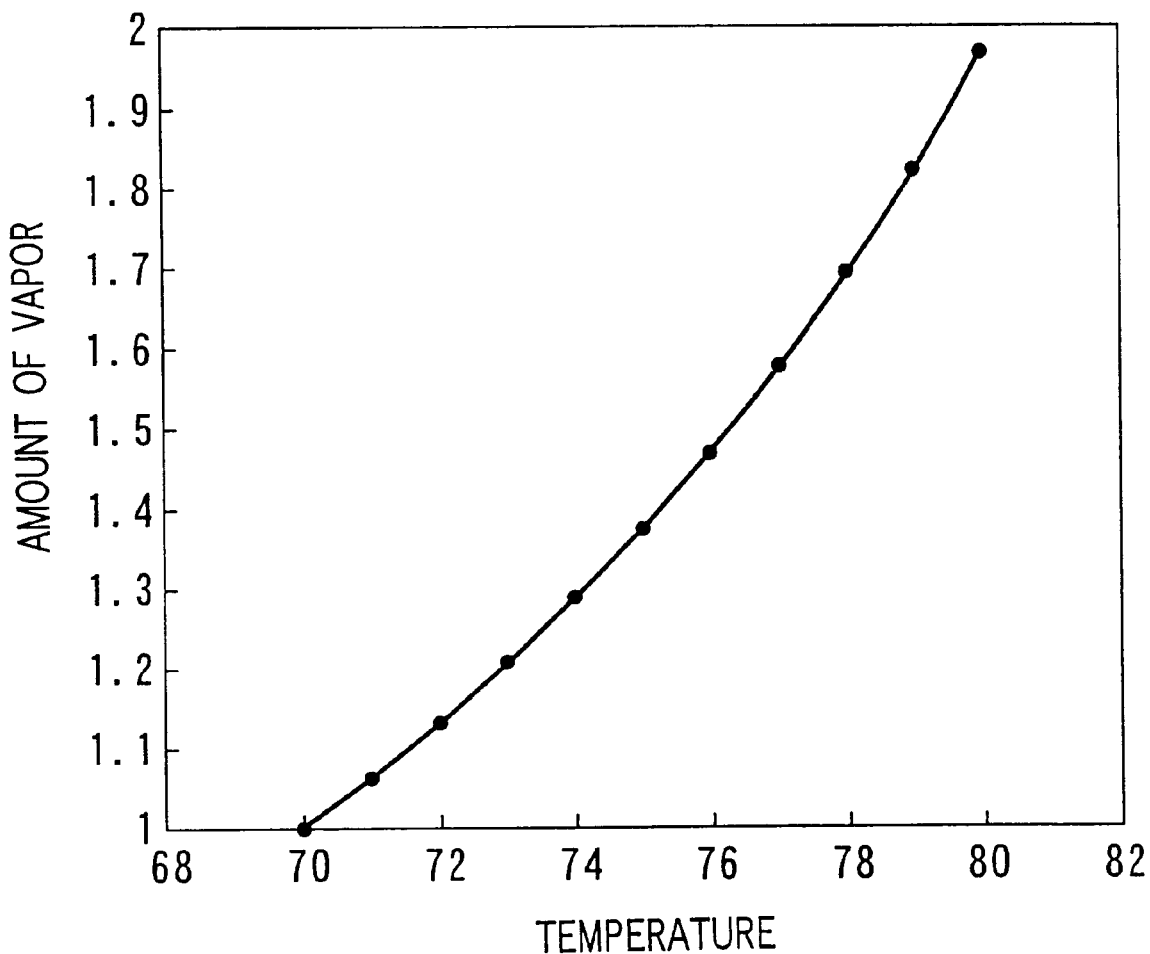
FIG. 11 is a view showing the relationship between the temperature and the amount of steam in the invention.

Although in the above embodiment, the temperature difference between a peripheral portion and a central portion of each separator was 1.5° C., it is desirable to limit, by not more than 5° C., the allowable temperature difference between the peripheral portion and the central portion of each separator. FIG. 11 shows the relationship, verified by the inventors, between the temperature of a reaction section and the amount of vapor carried out by a reactant gas. This figure shows relative values assumed when the amount of vapor at 70° C. is supposed to be 1. When the temperature increases, the saturated vapor pressure increases, thereby increasing the amount of vapor carried by the reactive gas. The temperature of a surface perpendicular to a direction in which an oxidant gas flows is higher at a central portion thereof than at an end portion thereof. Accordingly, the carried-out amount of vapor is large at the central portion, and small at the end portion. Therefore, and condensation occurs at the end portion.

The amount of water created in the reaction section is 0.4 in terms of the above-mentioned relative value. If the difference in carried-out amount between the central portion and the end portion is smaller than this value, the carried-out amount falls within the created amount of water, which means that a larger amount of condensation or evaporation than the created amount of water does not occur. Therefore, it is desirable that the carried-out amount be set within it. In other words, it is desirable to set the temperature of the central portion at 75° C. or less, supposing that the temperature of the end portion is 70° C.

Figure 12:
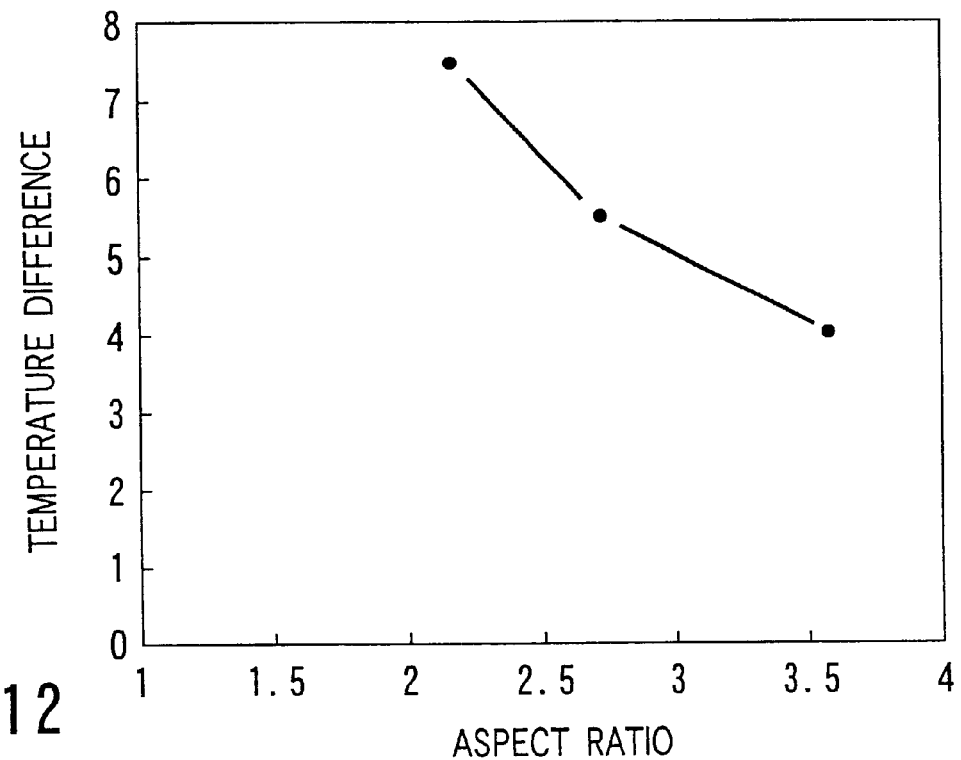
FIG. 12 is a view showing the relationship between a temperature difference and the aspect ratio of an expanded graphite separator employed in the invention.

FIG. 12 shows the relationship, verified by the inventors, between the ratio (aspect ratio) of the long side of the outside of each separator to its short side and the temperature difference between a central portion and an end portion of each separator, which is obtained when each separator is formed of an expanded graphite sheet (having a thermal conductivity of 140 W/mK). Suppose that the reaction area is set at a constant value of 100 $cm^2$. It is understood from FIG. 12 that the temperature difference is not more than 5° C. and hence the above-mentioned condition is satisfied, if the ratio of the long side to the short side is not less than 3.

Figure 13:
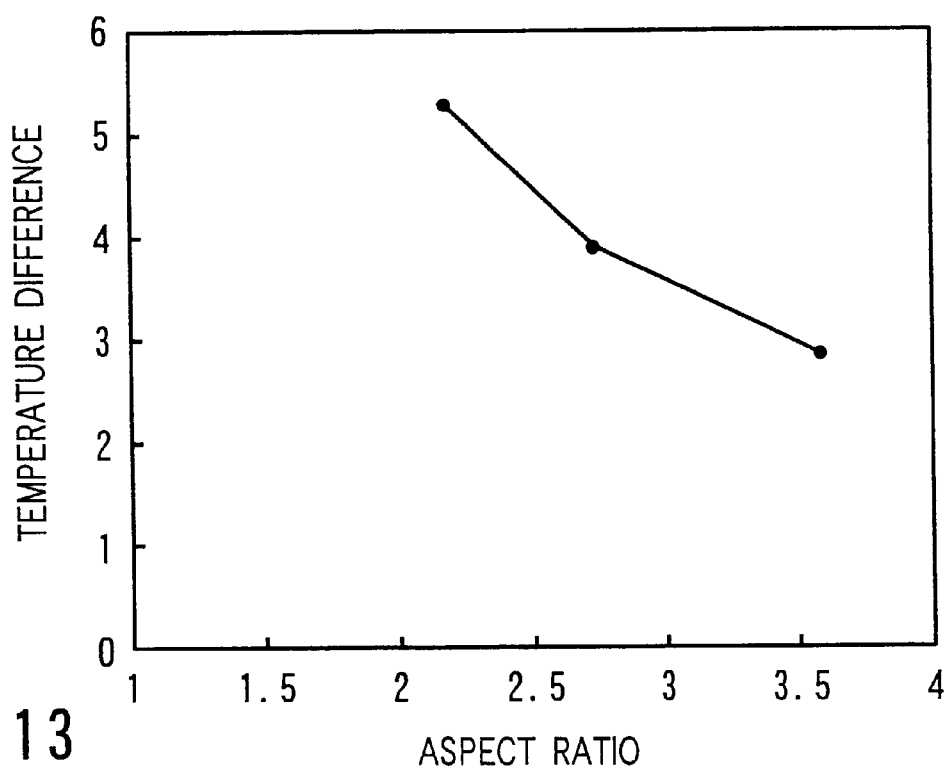
FIG. 13 is a view showing the relationship between a temperature difference and the aspect ratio of an aluminum separator employed in the invention.

FIG. 13 shows the relationship, verified by the inventors, between the ratio (aspect ratio) of the long side of the outside of each separator to its short side and the temperature difference between a central portion and an end portion of each separator, which is obtained when each separator is formed of aluminum (having a thermal conductivity of 200 W/mK). Suppose that the reaction area is set at a constant value of 100 $cm^2$. It is understood from FIG. 13 that the temperature difference is not more than 5° C. and hence the above-mentioned condition is satisfied, if the ratio of the long side to the short side is not less than 2.5.

As described above, forming each separator of a sheet of flexible graphite carbon and setting, not less than 3, the ratio of the long side of the outside of each separator to its short side permitted the temperature difference to be kept small even when a large electrode area was employed. Moreover, forming each separator of a sheet of flexible graphite carbon enabled the use of press molding, which resulted in a fuel cell stack that is suitable for mass production and cost effective.

FOURTH EMBODIMENT

In a fourth embodiment, each separator having the same structure as that employed in the second embodiment is made of aluminum. Aluminum is characterized in that it is a material of an extremely high thermal conductivity and hence an extremely suitable material for the cooling method of the invention, and can be easily molded since it is flexible.

In this embodiment, a clad material was used as aluminum material. Further, each separator was formed into the same shape as employed in the second embodiment, by press-molding an aluminum plate with a thickness of 1.5 mm. Further, each separator was provided with anti-corrosive and conductive coating.

Each electrode was set to be 5 cm wide and 20 cm long, and combined with separators constructed as above into a unit cell. Then, a fuel cell stack was formed by stacking a hundred of such unit cells, and a power generation test was executed under the same conditions as in the second embodiment, thereby measuring the vertical temperature distribution of each separator. As a result, it was found that the temperature of a peripheral portion of each separator was 70° C. and that of a central portion was 71.5° C., which means that the temperature difference was kept as small as in the third embodiment. Each separator could also be set to have a thickness of 1.5 mm, which means that it could be made thinner by 0.5 mm than that of the first or second embodiment.

In the above embodiment, the temperature difference between a central portion and a peripheral portion of each separator was 1.5° C. Supposing that the allowable maximum temperature difference between the central portion and the peripheral portion of each separator is 5° C., each electrode can have a width of 66 mm at maximum when it is made of aluminum. At this time, the length of each electrode is 152 mm, and hence it is preferable that each separator is set to have a width of 80 mm and a length of 200 mm. In other words, it is desirable that the ratio of the long side of the outside of each separator to its short side should be set at not less than 2.5.

The temperature difference could be reduced even when a large electrode area was employed, by forming each separator of a thin plate of an aluminum-based material, and setting, at not less than 2.5, the ratio of the long side of the outside of each separator to its short side. Furthermore, since each separator could be made thin, a compact and cost-effective fuel cell stack could be produced.

The same advantage as above could be obtained even when another metal having a high thermal conductivity, for example, copper, was used as the material of each separator.

FIFTH EMBODIMENT

Figures 14A, 14B:
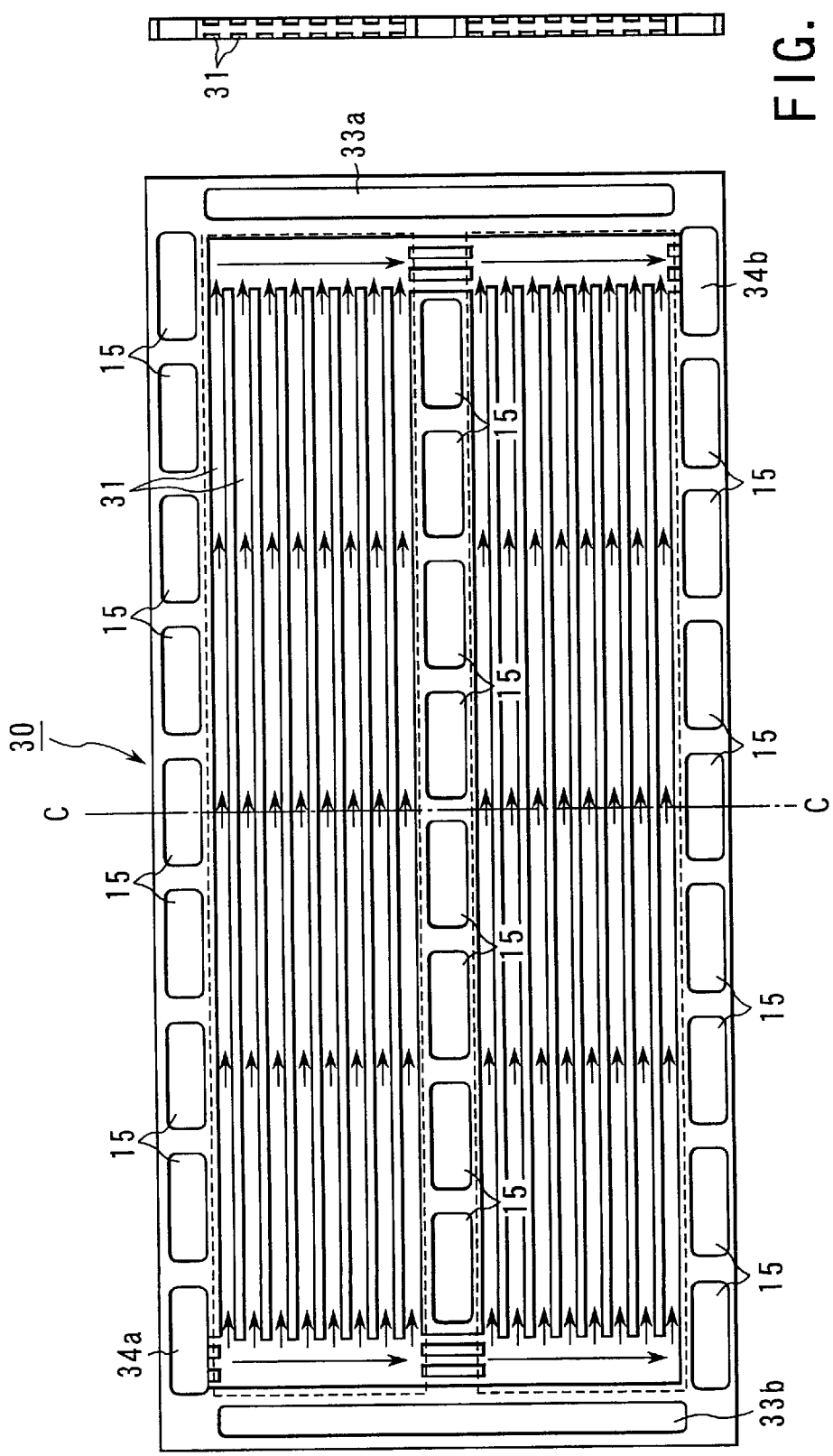
FIGS. 14A and 14B are views showing the structure of a separator incorporated in a fifth embodiment, FIG. 14A being a front view of a fuel-gas-passage side portion of the separator, and FIG. 14B being a sectional view taken along lines C—C in FIG. 14A.

FIGS. 14A and 14B show the structure of a separator incorporated in a fifth embodiment, FIG. 14A being a front view of a fuel-gas-passage side portion of the separator, and FIG. 14B being a sectional view taken along lines C—C in FIG. 14A.

In this embodiment, eight passages for a coolant are formed in each of those three portions, i.e. upper, lower and middle portions, of each separator 30, which are located parallel to the upper and lower sides thereof opposed to each other. In other words, twenty-four passages, in total, are formed in each separator. Each separator is set to be 13 cm wide, 25 cm long, and 2 mm thick, and is formed of aluminum.

Further, each electrode is set to be 10 cm wide and 20 cm long and vertically divided into two portions. As is shown in FIGS. 14A and 14B, a fuel gas supply manifold 34a is formed in an upper left portion of each separator 30, and a fuel gas discharge manifold 34b is formed in a lower right portion of each separator 30. Moreover, an oxidant gas supply manifold 33a and an oxidant gas discharge manifold 33b are provided in left and right side portions of each separator, respectively.

One surface of each separator 30 has upper and lower zones defined therein, in which fuel gas passages are formed such that they communicate with the fuel gas supply manifold 34a and the fuel gas discharge manifold 34b, thereby constituting fuel gas passages 31. A fuel gas is supplied from the fuel gas supply manifold 34a into the grooves of each separator 30 as indicated by the arrows, and non-reacted part of the fuel gas is exhausted through the fuel gas discharge manifold 34b.

On the other hand, the reverse surface (not shown) has two zones defined therein, in which oxidant gas passages are formed such that they communicate with the oxidant gas supply manifold 33a and the oxidant gas discharge manifold 33b formed in the right and left side portions, respectively. A coolant is introduced into the twenty-four coolant passages, i.e. the three portions—the upper, lower and middle portions—of each separator containing eight passages each. This coolant is flown in a direction perpendicular to the surface of each separator to thereby eliminate heat generated by reaction in each fuel cell.

Separators constructed as above were combined with each electrode into a unit cell. Then, a fuel cell stack was formed by stacking fifty of such unit cells, and a power generation test was executed. The conditions employed for the test were identical to those in the second embodiment. As a result, the two vertical zones of gas passages showed a uniform temperature distribution. The upper and lower ends of each separator were 69° C., a central portion of the gas passages was 72° C., and a central portion of each separator was 71° C.

Since in this embodiment, reaction heat generated in the two vertical zones was eliminated by the coolant that flows through the coolant passages provided in a central portion of each separator, the temperature of the central portion of each separator was higher than its lower and upper ends. However, its temperature difference could be reduced to a smaller value than in the conventional fuel cell stack.

SIXTH EMBODIMENT

Figures 15A, 15B:
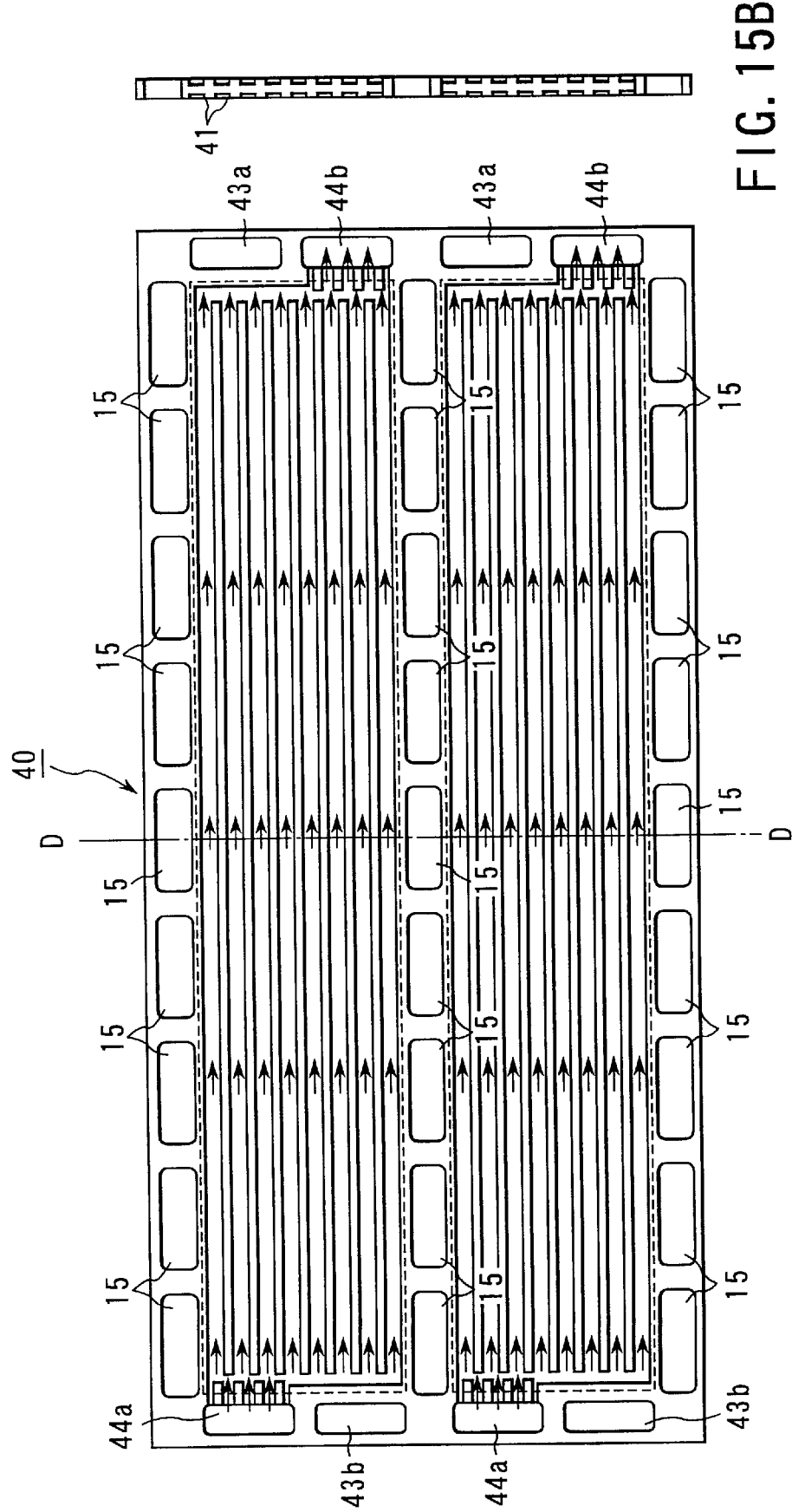
FIGS. 15A and 15B are views showing the structure of a separator incorporated in a sixth embodiment, FIG. 15A being a front view of a fuel-gas-passage side portion of the separator, and FIG. 15B being a sectional view taken along lines D—D in FIG. 15A.

FIGS. 15A and 15B are views showing the structure of a separator incorporated in a sixth embodiment, FIG. 15A being a front view of a fuel-gas-passage side portion of the separator, and FIG. 15B being a sectional view taken along lines D—D in FIG. 15A.

In this embodiment, nine passages for a coolant are formed in each of those three portions, i.e. upper, lower and middle portions, of each separator 30, which are located parallel to the upper and lower sides thereof opposed to each other. In other words, twenty-seven passages, in total, are formed in each separator. Each separator is set to be 13 cm wide, 25 cm long, and 2 mm thick, and is formed of aluminum.

Further, each electrode is set to be 10 cm wide and 20 cm long and vertically divided into two equal portions. As is shown in FIGS. 15A and 15B, two fuel gas supply manifolds 44a and two fuel gas discharge manifolds 44b are formed in left side portions of each separator 40, while two oxidant gas supply manifolds 43a and two oxidant gas discharge manifolds 43b are formed in right side portions of each separator 40. In other words, eight manifolds are formed in each separator 40.

One surface of each separator 40 has upper and lower zones defined therein, in which fuel gas passages are formed such that they communicate with the fuel gas supply manifolds 44a and the fuel gas discharge manifolds 44b, thereby constituting fuel gas passages 41. A fuel gas is supplied from the fuel gas supply manifolds 44a into the grooves of each separator 40 as indicated by the arrows, and non-reacted part of the fuel gas is exhausted through the fuel gas discharge manifolds 44b.

On the other hand, the reverse surface (not shown) has two zones defined therein, in which oxidant gas passages are formed such that they communicate with the oxidant gas supply manifolds 43a and the oxidant gas discharge manifolds 43b formed in the right and left side portions, respectively. A coolant is introduced into the twenty-seven coolant passages, i.e. the three portions—the upper, lower and middle portions—of each separator containing nine passages each. This coolant is flown in a direction perpendicular to the surface of each separator to thereby eliminate heat generated by reaction in each fuel cell.

Separators constructed as above were combined with each electrode into a unit cell. Then, a fuel cell stack was formed by stacking fifty of such unit cells, and a power generation test was executed. The conditions employed for the test were identical to those in the second embodiment. As a result, the two vertical zones of gas passages showed a uniform temperature distribution. The upper and lower ends of each separator were 69° C., a central portion of the gas passages was 72° C., and a central portion of each separator was 71° C.

Since in this embodiment, reaction heat generated in the two vertical zones was eliminated by the coolant that flows through the coolant passages provided in a central portion of each separator, the temperature of the central portion of each separator was higher than its lower and upper ends. However, its temperature difference could be reduced to a smaller value than in the conventional fuel cell stack, as in the fifth embodiment.

SEVENTH EMBODIMENT

Figure 16:
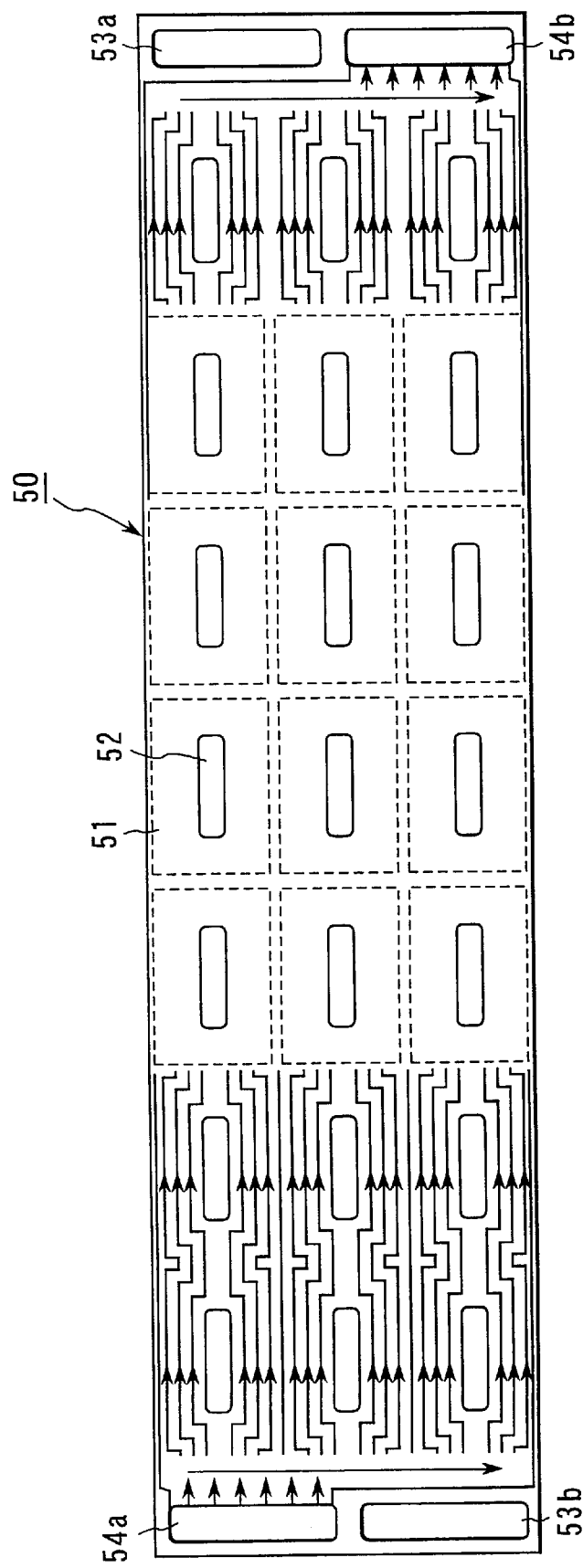
FIG. 16 is a view showing the structure of a separator incorporated in a seventh embodiment, and more specifically, a front view of a fuel-gas-passage side portion of the separator.

FIG. 16 is a view showing the structure of a separator incorporated in a seventh embodiment, and more specifically, a front view of a fuel-gas-passage side portion of the separator.

In this embodiment, a plurality of cooling areas 51 are provided on a central portion of each separator 50, and a coolant passage 52 for flowing a coolant therethrough is formed in a central portion of each cooling area 51. Specifically, each separator is set to be 13 cm wide, 25 cm long and 2 mm thick. As indicated by the broken lines, twenty-one cooling areas 51 having a width of 4 cm and a length of 3 cm are arranged with a ratio of 7 along the long side by 3 along the short side in an area of 12 cm×21 cm which corresponds to a reaction section for power generation. A coolant passage 52 is provided in a central portion of each cooling area for flowing a coolant in a direction perpendicular to the surface of each separator.

Further, as is shown in FIG. 16, a fuel gas supply manifold 54a and an oxidant gas discharge manifold 53b are provided in a left-side portion of each separator 50, while a fuel gas discharge manifold 54b and an oxidant gas supply manifold 53a are provided in its right-side portion. Fuel gas passages are formed in the surface of each separator so as to avoid the coolant passages 52, and communicate with the left and right supply manifolds and discharge manifolds.

The coolant is introduced into the twenty-one coolant passages 52 and made to flow in a direction perpendicular to the surface of each separator, thereby removing heat generated during reaction in each fuel cell. In this embodiment, each coolant passage is arranged to remove reaction heat generated in a corresponding cooling area. The inner wall of each coolant passage 52 serves as a heat transfer area. Since each coolant passage 52 is situated in a central portion of a corresponding cooling area 51, the entire inner wall of each coolant passage 52 is used as a heat transfer area, and hence efficient cooling can be executed.

EIGHTH EMBODIMENT

This embodiment is a modification of the fourth embodiment, in which the inner wall configuration of each coolant passage is modified. FIGS. 17A and 17B show the structure of a separator included in this embodiment, FIG. 17A being a front view of a fuel-gas-passage side portion of the separator, and FIG. 17B being a sectional view taken along lines E—E in FIG. 17A.

Each separator 60 employed in this embodiment is formed of aluminum, and three projections 63 with a width of 2 mm and a length of 5 mm are provided on the inner wall of each coolant passage 62. The other structure is similar to that of the fourth or second embodiment, and therefore its description is omitted.

A coolant is introduced into eighteen coolant passages 62 provided in upper and lower portions of each separator along its long sides, and is made to flow in a direction perpendicular to the surface of each separator, thereby removing heat generated during reaction in each fuel cell. The inner wall of each coolant passage 62 serves as a heat transfer area. In this embodiment, the projections 63 provided on the inner wall of each coolant passage 62 increase the length of the inner wall and hence the heat transmitting area, which enables efficient cooling.

NINTH EMBODIMENT

This embodiment is a modification of the third and eighth embodiments, in which the inner wall configuration of each coolant passage is modified. FIGS. 18A and 18B are views showing the structure of a separator incorporated in this embodiment, FIG. 18A being a front view of a fuel-gas-passage side portion of the separator, and FIG. 18B being a sectional view taken along lines F—F in FIG. 18A.

Each separator 70 is formed of a sheet of flexible graphite carbon, and arranged such that an inner wall central portion of each coolant passage 72 inwardly extends by 2 mm. Each extended portion is press molded to have the same thickness, i.e. 1 mm, as portions in which the fuel gas passages and oxidant gas passages are formed. As a result, extended portions 73 are formed. The other structure is similar to the third or second embodiment, and therefore its description is omitted.

A coolant is introduced into eighteen coolant passages 72 provided in upper and lower portions of each separator along its long sides, and is made to flow in a direction perpendicular to the surface of each separator, thereby removing heat generated during reaction in each fuel cell. The inner wall of each coolant passage 72 serves as a heat transfer area. In this embodiment, the extended portion 73 provided on the inner wall of each coolant passage 72 increases the heat transmitting area, and therefore, efficient cooling can be executed.

Moreover, expanded graphitic carbon that forms each separator is characterized in that when it is thinned and its density is increased, its thermal conductivity increases. Accordingly, high thermal conductivity can be obtained by thinning the extended portions to a thickness of 1 mm, with the result that further efficient cooling can be realized.

TENTH EMBODIMENT

This embodiment is a modification of the first embodiment, in which upper and lower coolant passages 82 are provided in two rows along the long sides of each separator 80, and those ones of the upper and lower coolant passages, which correspond to each other in a direction of flow of a coolant, are connected to each other in series.

Figure 19:
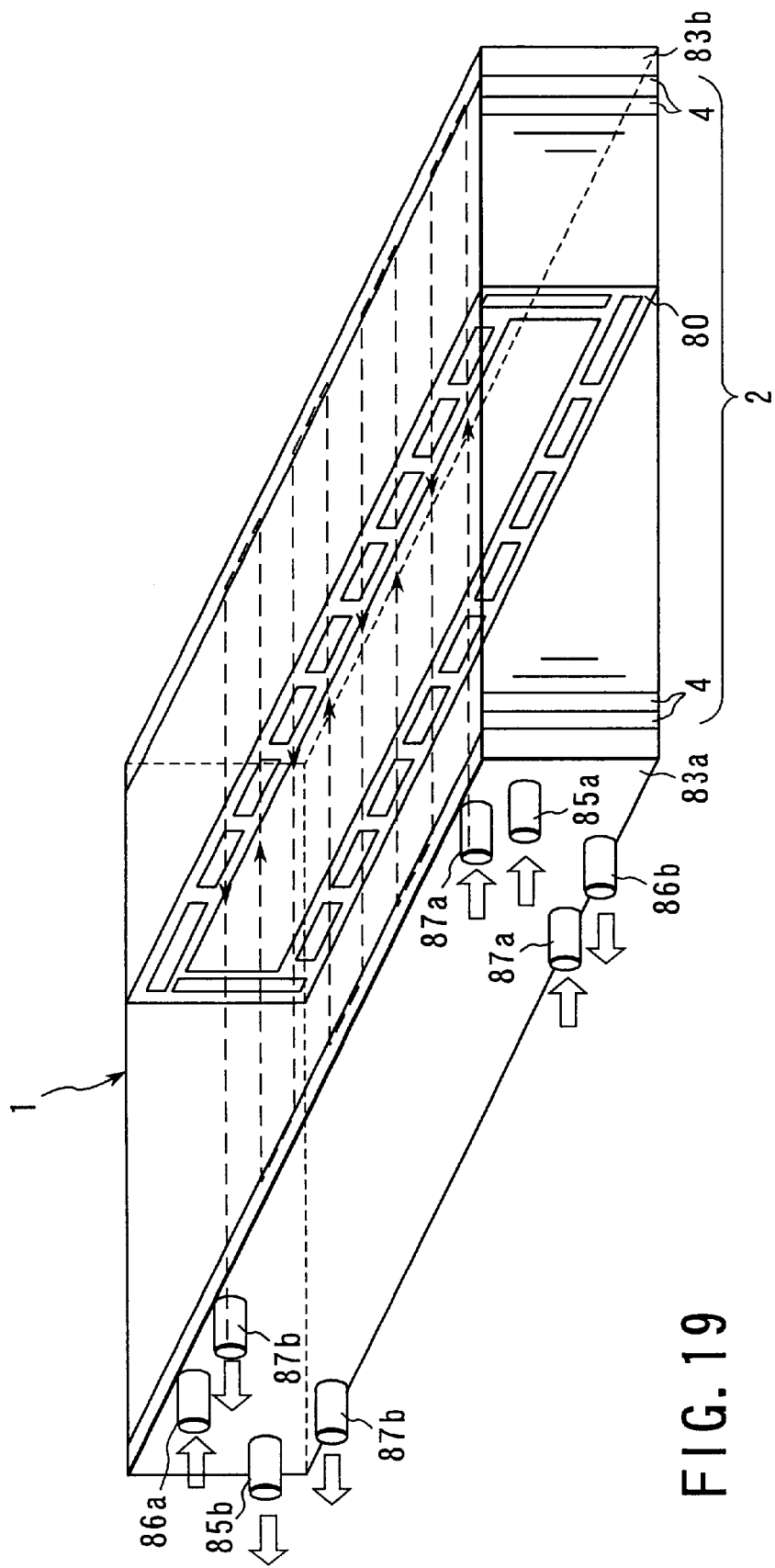
FIG. 19 is a perspective view showing the structure of a polymer electrolyte fuel cell stack according to a tenth embodiment of the invention.
Figures 20A, 20B:
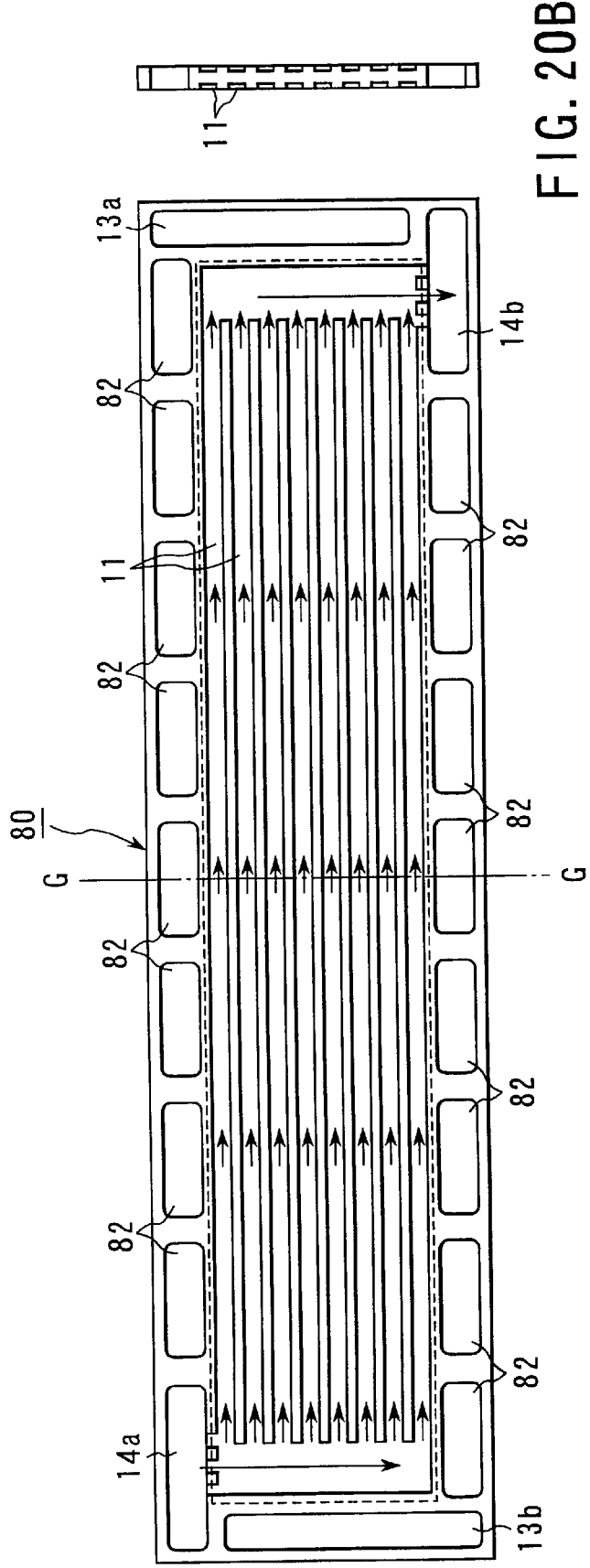
FIGS. 20A and 20B are views showing the structure of a separator incorporated in the tenth embodiment, FIG. 20A being a front view of a fuel-gas-passage side portion of the separator, and FIG. 20B being a sectional view taken along lines G—G in FIG. 20A.

FIG. 19 is a perspective view showing the structure of a polymer electrolyte fuel cell stack according to the tenth embodiment of the invention. FIGS. 20A and 20B are views showing the structure of a separator incorporated in the tenth embodiment, FIG. 20A being a front view of a fuel-gas-passage side portion of the separator, and FIG. 20B being a sectional view taken along lines G—G in FIG. 20A.

In this embodiment, a coolant is arranged to flow in series through eight coolant passages 82 provided in each of upper and lower portions of each separator. The other structure is similar to that of the first embodiment, and therefore its description is omitted.

The outside of each separator 80 was set to be 25 cm long, 7 cm wide and 2 mm thick, and was formed of a conductive and solid material, i.e. solid carbon in this embodiment.

FIGS. 21 and 21B are views showing a front end plate 83a appearing in FIG. 19, while FIGS. 22A and 22B are views showing a rear end plate 83b. The front and rear end plates 83a and 83b have connecting coolant passages 82b formed therein and connecting in series the upper and lower rows of coolant passages 82 of the separators 80.

Furthermore, as is shown in FIG. 19, the front end plate 83a has pipes for fluids attached thereto. Specifically, an oxidant gas inlet 85a is provided at an upper right end of the front end plate 83a, while an oxidant gas outlet 85b is provided at a lower left end of the end plate. A fuel gas inlet 86a and a fuel gas outlet 86b are provided at an upper left portion and a lower right portion of the end plate 83a, respectively. In addition, coolant inlets 87a are provided at upper and lower right portions of the front end plate 83a, and coolant outlets 87b are provided at upper and lower left portions of the front end plate 83a. Although water may be used as a coolant, an antifreeze liquid is more preferable in light of the case of using the coolant in cold places. In this embodiment, an ethylene glycol water solution is used.

The coolant is introduced through the two coolant inlets 87a provided at the front end plate 83a, and made to uniformly flow. More specifically, the coolant flows through the rightmost one of eight common coolant passages provided in upper and lower portions of each of separators, seal gaskets and electrolytic membrane, in a direction perpendicular to the surfaces of the components. While flowing, the coolant absorbs head through the walls of the passages, thereby executing cooling.

As is shown in FIGS. 19, 21A and 21B, the coolant, introduced through the two coolant inlets 87a provided at the front end plate 83a, reaches the rear end plate 83b, then passes through each connecting coolant passage 82b provided in the rear end plate 83b, reaches the left coolant passage, and returns to the front end plate 83a. After that, as shown in FIG. 19, the coolant flows in series through the eight coolant passages, whereby it absorbs heat from the walls of the passages to cool the fuel cell stack.

Since in this embodiment, the inlets of the coolant are provided at right end portions, and the outlets are provided at left end portions to make the coolant flow from right to left, the direction of the flow of the coolant is the same as that of the flow of the oxidant gas in each separator. As a result, it is possible to realize a temperature distribution, in which the temperature of the right end portions at which the coolant inlets are provided is low, and the temperature of the left end portions at which the coolant outlets are provided is high. Setting the oxidant gas outlets at a high temperature can prevent vapor from condensing at the oxidant gas outlets, with the result that water created during reaction can be efficiently exhausted and accordingly more effective cooling can be executed.

ELEVENTH EMBODIMENT

This embodiment is a modification of the tenth embodiment, in which a coolant flowing through upper and lower coolant passages 92, provided in two rows along the long sides of each separator 90, is partially unified and made to flow through those ones of the upper and lower coolant passages of all separators 90, which correspond to each other.

Figure 23:
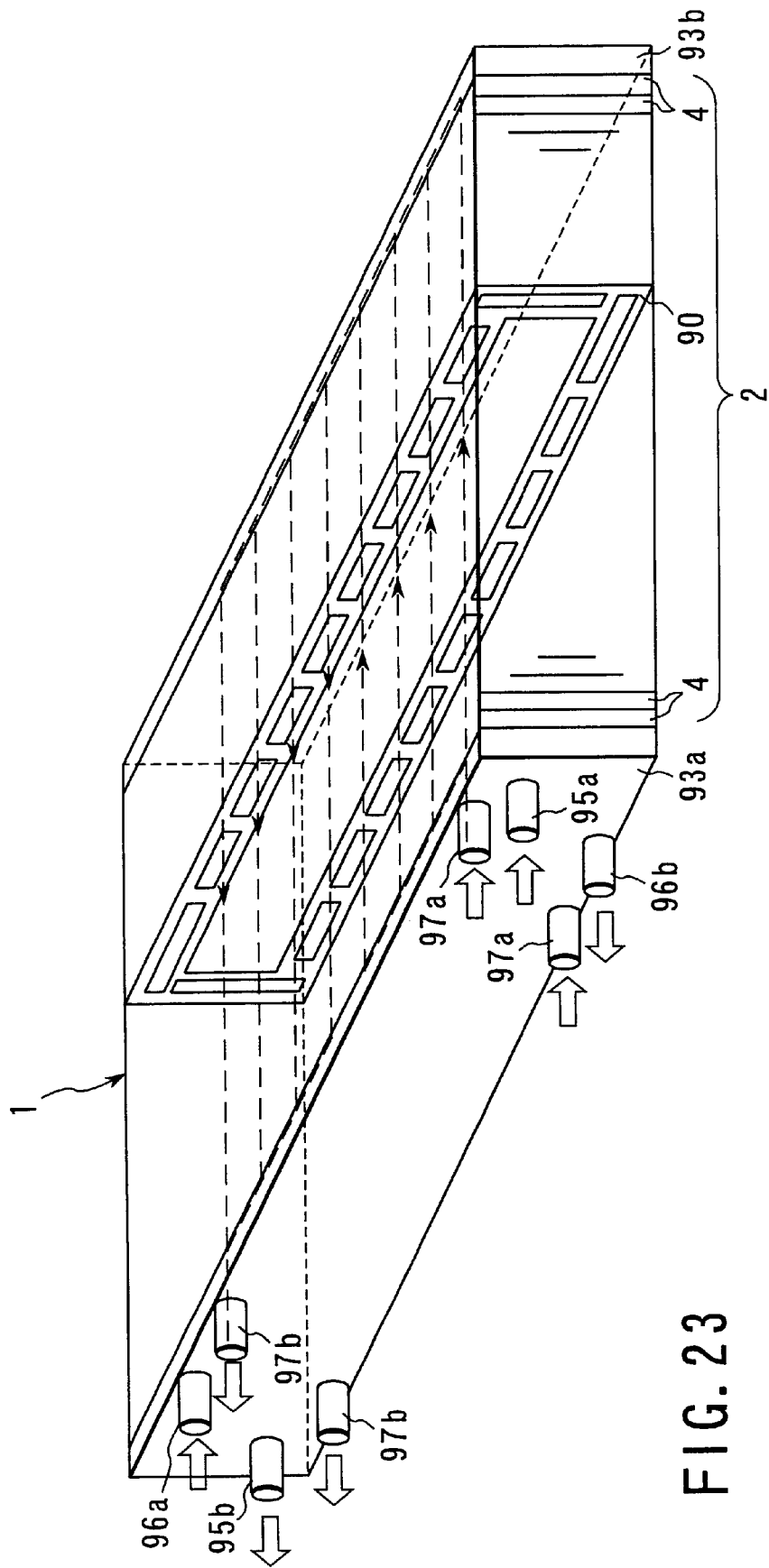
FIG. 23 is a perspective view showing the structure of a polymer electrolyte fuel cell stack according to an eleventh embodiment of the invention.

FIG. 23 is a perspective view showing the structure of a polymer electrolyte fuel cell stack according to the eleventh embodiment, FIGS. 24A and 24B are views showing the structure of a front end plate 93a, and FIGS. 25A and 25B are views showing the structure of a rear end plate 93b.

As is shown in FIG. 23, this embodiment is constructed such that the coolant flowing through four coolant passages, which are included in the eight coolant passages provided in each of upper and lower portions of each separator, flows in parallel in the same direction. Further, to realize this way of flow, the coolant, introduced through the two coolant inlets 97a provided at the front end plate 93a, is distributed into the four coolant passages located in the right half portion, then passes therethrough, and reaches the rear end plate 93b, as is shown in FIGS. 24A and 24B.

The coolant having reached the rear end plate 93b passes through coolant passages formed in the rear end plate 93b, then reaches the four coolant passages located in the left half portion, and returns to the front end plate 93a, as is shown in FIGS. 25A and 25B.

Thus, grouping eight coolant passages into two parts each including four passages, and making the coolant flow through the respective parts enables setting of right and left portions of each separator at a low temperature and a high temperature, respectively, as in the tenth embodiment. This enables setting of the oxidizer outlet and its vicinities at a high temperature, thereby enabling efficient discharge of water created during reaction.

TWELFTH EMBODIMENT

This embodiment is a modification of the tenth embodiment, in which upper and lower coolant passages are provided in two rows along the long sides of each separator, and those ones of the upper and lower coolant passages, which correspond to each other in a direction of flow of a coolant, are connected to each other in series.

Figure 26:
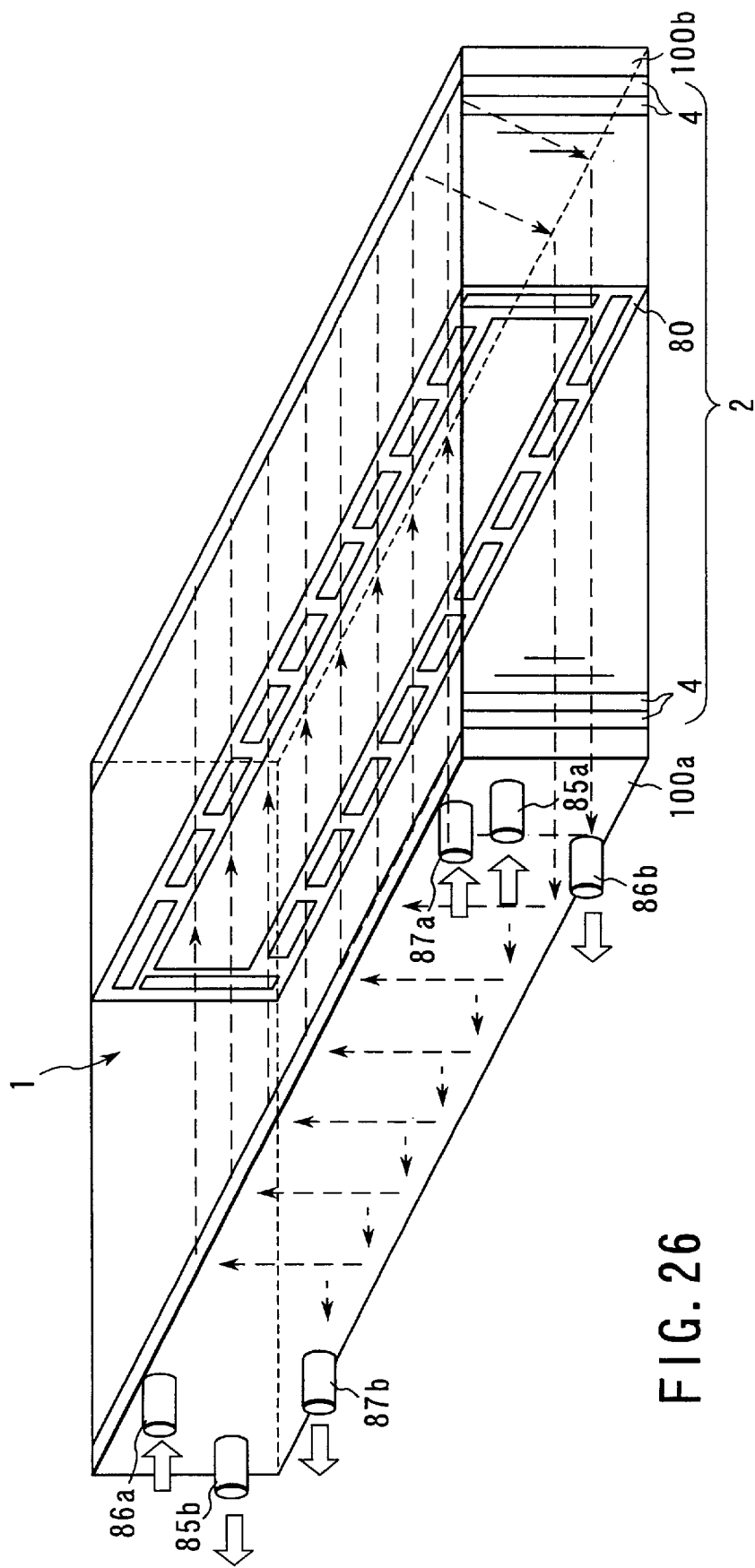
FIG. 26 is a perspective view showing the structure of a polymer electrolyte fuel cell stack according to a twelfth embodiment of the invention.

FIG. 26 is a perspective view showing the structure of a polymer electrolyte fuel cell stack according to the twelfth embodiment. FIGS. 27A and 27B show the structure of a front end plate 100a appearing in FIG. 26, and FIGS. 28A and 28B show the structure of a rear end plate 100b. The front and rear end plates 100a and 100b and separators 80 each have upper and lower coolant passages 102b formed therein substantially parallel to the short sides of the separators 80.

A coolant introduced through a single coolant inlet provided at the front end plate 100a flows the rightmost ones of the upper coolant passages 102b, and reaches the rear end plate 100b. The rear end plate 100b has upper and lower coolant passages 102b, and the coolant is guided into the lower rightmost one of the passages 102b. The coolant guided to the lower rightmost passage 102b passes through a similar communication passage in the front end plate 100a, and reaches the second one, from the right, of the upper coolant passages 102b.

Thus, alternately flowing the coolant through the upper and lower coolant passages 102b from the right end to the left end enables setting of right and left portions of each separator 80 at low and high temperatures, respectively, as in the tenth embodiment. This enables setting of the oxidizer outlet and its vicinities at a high temperature, thereby enabling efficient discharge of water created during reaction.

As described above, the present invention can provide a polymer electrolyte fuel cell stack, in which the temperature difference in each separator is minimized and also the thickness in the cell-stacked direction is minimized, thereby securing a large reaction area although the entire cell stack is compact.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A polymer electrolyte fuel cell stack without a cooling plate, comprising:
   a plurality of cells stacked on each other; and
   separators inserted between the cells, each of the cells including an anode, a cathode, and a solid polymer electrolyte membrane held between the anode and the cathode, and each of the separators including at least one of a fuel gas passage configured to supply the anode with a fuel gas, and an oxidant gas passage configured to supply the cathode with an oxidant gas;
   wherein each of the separators has a rectangular outline; and
   wherein a plurality of coolant passages are formed in portions of each separator, the plurality of coolant passages are configured to be located around the fuel gas passage and the oxidant gas passage and are disposed substantially parallel to opposite long sides of the separator, so as to minimize a temperature difference between a central portion and an upper or lower end of each electrode and to remove a reaction heat with a coolant flowing in a direction perpendicular to a surface of the separator.

2. A polymer electrolyte fuel cell stack without a cooling plate, comprising:
   a plurality of cells stacked on each other; and
   separators inserted between the cells, each of the cells including an anode, a cathode, and a solid polymer electrolyte membrane held between the anode and the cathode, and each of the separators including at least one of a fuel gas passage configured to supply the anode with a fuel gas, and an oxidant gas passage configured to supply the cathode with an oxidant gas;
   wherein each of the separators has a rectangular outline; and
   wherein a surface of each separator, which contacts electrodes, includes a plurality of cooling areas, a coolant passage being formed in a central portion of each of the cooling areas, so as to minimize a temperature difference between a central portion and an upper or lower end of each electrode and to remove a reaction heat with a coolant flowing in a direction perpendicular to the surface of the separator.

3. The polymer electrolyte fuel cell stack without a cooling plate according to claim 2, wherein a supply or discharge manifold for the fuel gas or the oxidant gas is provided at a portion of each separator located around the fuel gas passage and the oxidant gas passage and is substantially parallel to a short side of each separator.

4. The polymer electrolyte fuel cell stack without a cooling plate according to claim 2, wherein each separator is formed of a sheet made of flexible graphite carbon, and a ratio of a long side of each separator to a short side thereof is not less than 3.

5. The polymer electrolyte fuel cell stack without a cooling plate according to claim 2, wherein each separator is formed of a metallic thin plate containing copper or aluminum, and a ratio of a long side of each separator to a short side thereof is not less than 2.5.

6. The polymer electrolyte fuel cell stack without a cooling plate according to claim 2, wherein a plurality of projections are provided on an inner wall of the coolant passage or each coolant passage formed in each separator.

7. The polymer electrolyte fuel cell stack without a cooling plate according to claim 2, wherein an extended portion is provided on an inner wall of the coolant passage or each coolant passage formed in each separator.

8. The polymer electrolyte fuel cell stack without a cooling plate according to claim 2, wherein coolant passages of the separators are connected in series.

9. The polymer electrolyte fuel cell stack without a cooling plate according to claim 2, wherein some of coolant passages of the separators are connected in parallel, and the parallel connected coolant passages are connected in series to other coolant passages of the remaining of the separators.

10. The polymer electrolyte fuel cell stack without a cooling plate according to claim 1, wherein a supply or discharge manifold for the fuel gas or the oxidant gas is provided at a portion of each separator located around the fuel gas passage and the oxidant gas passage and is substantially parallel to a short side of each separator.

11. The polymer electrolyte fuel cell stack without a cooling plate according to claim 1, wherein each separator is formed of a sheet made of flexible graphite carbon and a ratio of a long side of each separator to a short side thereof is not less than 3.

12. The polymer electrolyte fuel cell stack without a cooling plate according to claim 1, wherein each separator is formed of a metallic thin plate containing copper or aluminum, and a ratio of a long side of each separator to a short side thereof is not less than 2.5.

13. The polymer electrolyte fuel cell stack without a cooling plate according to claim 1, wherein a plurality of projections are provided on an inner wall of the coolant passage or each coolant passage formed in each separator.

14. The polymer electrolyte fuel cell stack without a cooling plate according to claim 1, wherein an extended portion is provided on an inner wall of the coolant passage or each coolant passage formed in each separator.

15. The polymer electrolyte fuel cell stack without a cooling plate according to claim 1, wherein the coolant passages are connected in series.

16. The polymer electrolyte fuel cell stack without a cooling plate according to claim 1, wherein some of the coolant passages are connected in parallel, and the parallel connected coolant passages are connected in series to other coolant passages.

* * * * *

UNITED STATES PATENT AND TRADEMARK OFFICE
CERTIFICATE OF CORRECTION

PATENT NO. : 6,492,055 B1
DATED : December 10, 2002
INVENTOR(S) : Shimotori et al.

It is certified that error appears in the above-identified patent and that said Letters Patent is hereby corrected as shown below:

<u>Title page, Item [54], Column 1, line1,</u>
The Title should read as follows:

-- POLYMER ELECTROLYTE FUEL CELL STACK --

Signed and Sealed this

Eleventh Day of March, 2003

JAMES E. ROGAN
*Director of the United States Patent and Trademark Office*